United States Patent
Kim et al.

(10) Patent No.: US 10,620,669 B2
(45) Date of Patent: Apr. 14, 2020

(54) ELECTRONIC DEVICE INCLUDING MULTIBAND ANTENNA

(71) Applicant: Samsung Electronics Co., Ltd., Suwon-si, Gyeonggi-do (KR)

(72) Inventors: Tae Young Kim, Suwon-si (KR); In Young Lee, Hwaseong-si (KR); Su Min Yun, Incheon (KR); Jung Su Ha, Osan-si (KR); Suk Hyun, Suwon-si (KR); Jae Bong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 15/235,826

(22) Filed: Aug. 12, 2016

(65) Prior Publication Data
US 2017/0045916 A1    Feb. 16, 2017

(30) Foreign Application Priority Data
Aug. 13, 2015    (KR) .......................... 10-2015-0114946

(51) Int. Cl.
*G06F 1/16*    (2006.01)
*G06F 1/20*    (2006.01)
(Continued)

(52) U.S. Cl.
CPC ............ *G06F 1/1656* (2013.01); *G06F 1/163* (2013.01); *G06F 1/1607* (2013.01); *G06F 1/1635* (2013.01); *G06F 1/1643* (2013.01); *G06F 1/1698* (2013.01); *G06F 1/203* (2013.01); *G06F 3/041* (2013.01); *H01Q 1/273* (2013.01); *H01Q 1/48* (2013.01); *G04G 17/045* (2013.01);
(Continued)

(58) Field of Classification Search
CPC ...... G06F 1/1656; G06F 1/1607; G06F 1/163; G06F 1/1635; G06F 1/1643; G06F 1/1698; G06F 1/203
See application file for complete search history.

(56) References Cited

U.S. PATENT DOCUMENTS 6,531,988 B1    3/2003    Koyama
6,897,814 B2    5/2005    Iwai et al.
(Continued)

FOREIGN PATENT DOCUMENTS

CN    101889370 A    11/2010
CN    103311671 A    9/2013
(Continued)

OTHER PUBLICATIONS

Chinese Office Action dated Apr. 30, 2019, issued in Chinese Application No. 201680047694.1.

*Primary Examiner* — Daniel P Wicklund
*Assistant Examiner* — Christopher L Augustin
(74) *Attorney, Agent, or Firm* — Jefferson IP Law, LLP

(57) ABSTRACT

An electronic device is provided. The electronic device includes an outer housing having a first conductive structure, a display adapted to expose at least a portion of the display through the first surface of the outer housing, and a printed circuit board (PCB) electrically connected to the display, where the first conductive structure includes a first point connected to a feeder of the PCB and a second point connected to a ground part of the PCB, and where the display includes a second conductive structure electrically connected to the PCB.

18 Claims, 14 Drawing Sheets

(51) Int. Cl.
| | | |
|---|---|---|
| *H01Q 1/27* | (2006.01) | |
| *G06F 3/041* | (2006.01) | |
| *H01Q 1/48* | (2006.01) | |
| *H01Q 1/38* | (2006.01) | |
| *G04G 17/04* | (2006.01) | |
| *G04G 17/08* | (2006.01) | |
| *G04G 17/06* | (2006.01) | |
| *H04B 1/3827* | (2015.01) | |
| *G04G 21/04* | (2013.01) | |

(52) U.S. Cl.
CPC ............. *G04G 17/06* (2013.01); *G04G 17/08* (2013.01); *G04G 21/04* (2013.01); *G06F 2203/04108* (2013.01); *H01Q 1/38* (2013.01); *H04B 1/385* (2013.01); *H04B 2001/3861* (2013.01)

(56) References Cited

U.S. PATENT DOCUMENTS

| | | | |
|---|---|---|---|
| 8,269,689 B2 | 9/2012 | Lin et al. | |
| 8,275,327 B2 | 9/2012 | Yi et al. | |
| 9,373,883 B2 | 6/2016 | Hwang et al. | |
| 2002/0061775 A1 | 5/2002 | Iwai et al. | |
| 2004/0066337 A1* | 4/2004 | Fukuda | H01P 1/213 343/700 MS |
| 2006/0270472 A1 | 11/2006 | Chen et al. | |
| 2007/0109208 A1* | 5/2007 | Turner | H01Q 1/273 343/718 |
| 2010/0112964 A1 | 5/2010 | Yi et al. | |
| 2011/0285600 A1 | 11/2011 | Lin et al. | |
| 2012/0112973 A1 | 5/2012 | Ryou et al. | |
| 2014/0210675 A1 | 7/2014 | Hwang et al. | |
| 2014/0292590 A1* | 10/2014 | Yoo | H01Q 1/243 343/702 |
| 2015/0084818 A1* | 3/2015 | Yun | H01Q 1/243 343/702 |
| 2015/0109170 A1* | 4/2015 | Kang | G06F 1/182 343/702 |
| 2015/0130666 A1* | 5/2015 | Pan | H02J 7/0045 343/702 |
| 2015/0261254 A1* | 9/2015 | Hiroki | G06F 1/163 361/679.03 |
| 2016/0064804 A1 | 3/2016 | Kim et al. | |
| 2016/0301126 A1 | 10/2016 | Hwang et al. | |
| 2016/0341486 A1* | 11/2016 | Kim | F28D 15/046 |
| 2018/0212312 A1 | 7/2018 | Hwang et al. | |

FOREIGN PATENT DOCUMENTS

| | | |
|---|---|---|
| KR | 10-2015-0091905 A | 8/2015 |
| KR | 10-2016-0026581 A | 3/2016 |

\* cited by examiner

ELECTRONIC DEVICE INCLUDING MULTIBAND ANTENNA

CROSS-REFERENCE TO RELATED APPLICATION(S)

This application claims the benefit under 35 U.S.C. § 119(a) of a Korean patent application filed on Aug. 13, 2015 in the Korean Intellectual Property Office and assigned Serial number 10-2015-0114946, the entire disclosure of which is hereby incorporated by reference.

TECHNICAL FIELD

The present disclosure relates to an electronic device that may transmit and receive signals through a multiband antenna.

BACKGROUND

Due to the development of electronic devices such as smartphones and tablet personal computers (PCs), wearable devices have been increasingly used. Such a wearable device is equipped with a communication function to perform various functions such as voice communications, identification of messages, wireless payments.

The wearable device is compactly manufactured to have a small size such that it may be mounted to a part of a human body, and may have a limited mounting space. The wearable electronic device may be arranged such that various devices, modules, and antennas are mounted in a limited mounting space.

An electronic device such as a wearable device according to the related art has a large thickness and cannot be made in a small size when various antennas for wireless Internet, wireless payments, or overseas roaming services.

When a metal component is present inside or outside the electronic device, a performance of the antenna may rapidly decrease due to a scattering effect or a trapping effect of electromagnetic fields by a metal. Accordingly, while various method for ensuring a sufficient spacing distance from a metal to prevent lowering of performance, the device may be excessively deformed, costs may increase due to addition of materials, and the thickness of the electronic device may increase.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that may implement a multiband antenna by utilizing a conductive outer part of the electronic device as an antenna radiator and also utilizing peripheral metallic components such as a display as a ground area.

Another aspect of the present disclosure is to provide an electronic device with a multiband antenna that may improve communication performance by utilizing a conductive outer part of the electronic device as an antenna radiator and also utilizing peripheral conductive structures such as a display for the purpose of tuning frequency.

In accordance with an aspect of the present disclosure, an electronic device is provided. The electronic device includes an outer housing that comprises a first surface facing a first direction, a second surface facing a second direction opposite to the first direction, and a side surface surrounding a space between the first surface and the second surface, a display adapted to expose at least a portion of the display through the first surface of the outer housing, a printed circuit board (PCB) arranged between the second surface of the outer housing and the display, a communication circuit arranged on or over the PCB, a ground member arranged at least at a portion of the PCB, a conductive structure formed of at least one of the first surface of the outer housing or at least a portion of the side surface is electrically connected to the communication circuit, a first conductive plate arranged between the first surface and the second surface of the outer housing is electrically connected to at least one of the ground member or the conductive structure, and a second conductive plate arranged between the first conductive plate and the second surface of the outer housing is electrically connected to at least one of the ground member or the conductive structure.

In accordance with an aspect of the present disclosure, an electronic device is provided. The electronic device includes an outer housing having a first conductive structure, a display adapted to expose at least a portion of the display through the first surface of the outer housing, and a printed circuit board (PCB) electrically connected to the display, where the first conductive structure includes a first point connected to a feeder of the PCB and a second point connected to a ground part of the PCB, and where the display comprises a second conductive structure electrically connected to the PCB.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
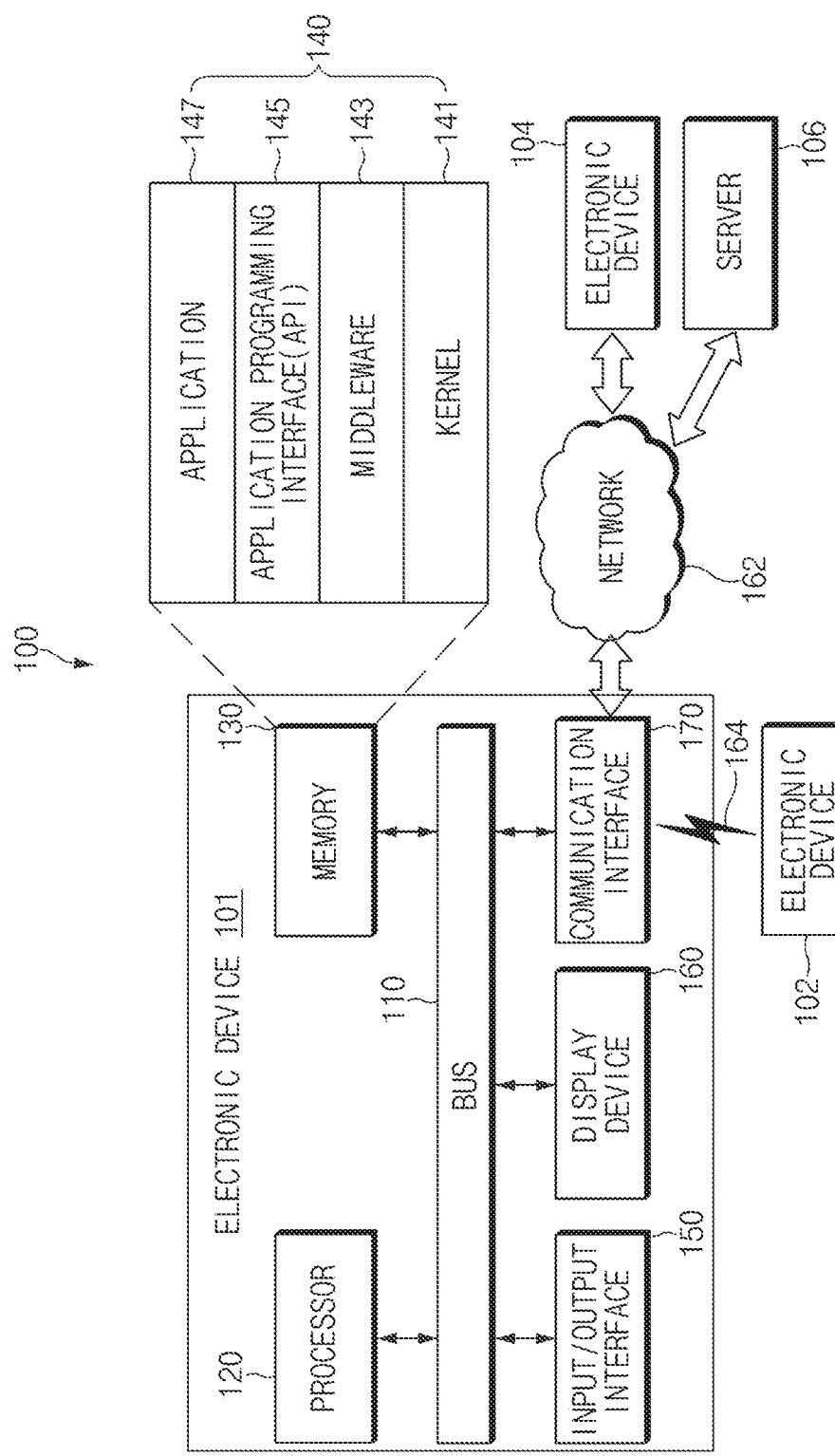
FIG. 1 illustrates an electronic device in a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. central processing unit (CPU), for example, a "processor configured to (or set to) perform A, B, and C" may mean a dedicated processor (for example, an embedded processor) for performing a corresponding operation or a generic-purpose processor (for example, a CPU or an application processor (AP)) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer 3 (MP3) players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a television (TV) box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates an electronic device in a network environment according to an embodiment of the present disclosure.

Referring to FIG. 1, there is illustrated an electronic device 101 in a network environment 100 according to various embodiments. The electronic device 101 may include a bus 110, a processor 120, a memory 130, an input/output (I/O) interface 150, a display 160, and a communication interface 170. According to an embodiment, the electronic device 101 may not include at least one of the above-described elements or may further include another element(s).

For example, the bus 110 may interconnect the above-described elements 120 to 170 and may include a circuit for conveying communications (e.g., a control message and/or data) among the above-described elements.

The processor 120 may include one or more of a CPU, an AP, or a communication processor (CP). The processor 120 may perform, for example, data processing or an operation associated with control and/or communication of at least one other element(s) of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "application") 147. At least a part of the kernel 141, the middleware 143, or the API 145 may be called an "operating system (OS)".

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be an interface through which the application 147 controls a function provided by the kernel 141 or the middleware 143, and may include, for example, at least one interface or function (e.g., an instruction) for a file control, a window control, image processing, a character control, or the like.

The I/O interface 150 may transmit an instruction or data, input from a user or another external device, to another element(s) of the electronic device 101. Furthermore, the I/O interface 150 may output an instruction or data, received from another element(s) of the electronic device 101, to a user or another external device.

The display 160 may include, for example, a liquid crystal display (LCD), a light-emitting diode (LED) display, an organic LED (OLED) display, or a microelectromechanical systems (MEMS) display, or an electronic paper display. The display 160 may display, for example, various kinds of content (e.g., a text, an image, a video, an icon, a symbol, and the like) to a user. The display 160 may include a touch screen and may receive, for example, a touch, gesture, proximity, or hovering input using an electronic pen or a portion of a user's body.

According to various embodiments, a display device 160 may have a conductive structure at a portion thereof. The conductive structure may be connected to a printed circuit board (PCB) or connected to an outer metal housing of the electronic device to be used as a part of an antenna.

The communication interface 170 may establish communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may include at least one of, for example, long-term evolution (LTE), LTE-advance (LTE-A), code division multiple access (CDMA), wideband CDMA (WCDMA), universal mobile telecommunications system (WMTS), wireless broadband (WiBro), or global system for mobile communications (GSM), or the like, as a cellular communication protocol. Furthermore, the wireless communication may include, for example, a local area network 164. The local area network 164 may include at least one of a wireless fidelity (Wi-Fi), a near field communication (NFC), or a GNSS, or the like. The GNSS may include at least one of a global positioning system (GPS), a global navigation satellite system (Glonass), Beidou Navigation Satellite System (hereinafter referred to as "Beidou"), the European global satellite-based navigation system (Galileo), or the like. In this specification, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., local area network (LAN) or wide area network (WAN)), an Internet, or a telephone network.

According to various embodiments, a communication interface 170 may include various antennas for wireless communications. The antenna may have various resonance characteristics according to the length and form of a radiator, a connection location of a feeder and a ground part, an arrangement form of a peripheral conductive material, and the like. An outer housing of an electronic device 101, which includes a metallic material, may be used as the radiator of the antenna.

According to various embodiments, the communication interface 170 may include a communication circuit and a control circuit connected to the antenna. The communication circuit and the control circuit may be mounted on a PCB.

Each of the first and second external electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the electronic devices 102 and 104 or the server 106). According to an embodiment, in the case where the electronic device 101 executes any function or service automatically or in response to a request, the electronic device 101 may not perform the function or the service internally, it may, alternatively or additionally, request another device (e.g., the electronic device 102 or 104 or the server 106) to perform. The another electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
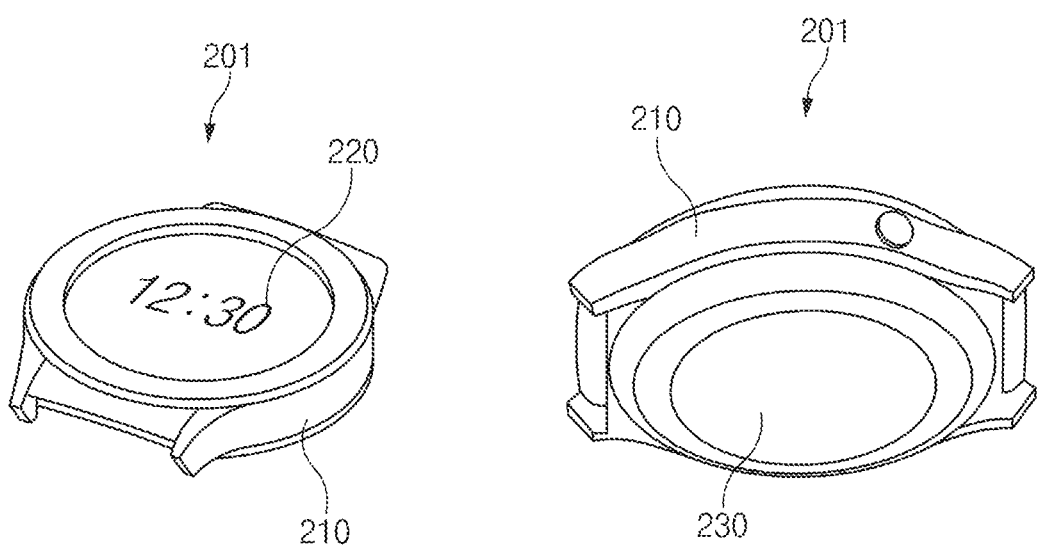
FIG. 2 illustrates a perspective view of an electronic device according to an embodiment of the present disclosure.

FIG. 2 illustrates a perspective view of an electronic device according to an embodiment of the present disclosure.

Referring to FIG. 2, although an electronic device 201 of a watch type wearable electronic device is illustrated, the present disclosure is not limited thereto. In various embodiments, the electronic device 201 may be the electronic device 101 of FIG. 1. The electronic device 201 may include an outer housing 210, a display 220, and a rear cover 230.

The outer housing 210 according to various embodiments may have a through-hole of a specific size at the center of a first surface (hereinafter, a front surface) to define an opening. The size of the through-hole may determine a size by which the display 220 is exposed. As another example, the outer housing 210 may include a peripheral part that defines a through-hole and a side wall that surrounds the through-hole in a direction perpendicular to the peripheral part or forms a specific angle with the peripheral part. As another example, the outer housing 210 may protect various configurations (for example, a display, a battery, and a PCB) arranged inside the outer housing 210. Although FIG. 2 illustrates that the through-hole is circular, the present disclosure is not limited thereto.

The outer housing 210 according to various embodiments may be coupled to the rear cover 230. A button or a stem may be additionally mounted on one side of the outer housing 210, and a binding structure (not illustrated) that may be attached to or detached from the body of the user may be further provided. The binding structure, for example, may be implemented by two band shapes connected to opposite sides of a periphery of the outer housing 210.

According to various embodiments, at least a portion of the outer housing 210 may be implemented by a conductive material (for example, metal). In this case, at least a portion (hereinafter, a first conductive structure) of the outer housing 210 may be used as an antenna radiator for transmitting and receiving data to and from an external device. For example, the first conductive structure may be used as an antenna of a mobile communication module such as 2G, 3G, or 4G. Further, the first conductive structure may be used as an antenna of a GPS communication module, a Wi-Fi communication module, an NFC communication module, or a Bluetooth (BT) communication module.

The first conductive structure according to various embodiments may be formed in the entire outer housing 210 or an area of the outer housing 210. For example, the first conductive structure may be formed at a periphery of the through-hole through which the display 220 is exposed. As another example, the first conductive structure may be formed on a side wall of the outer housing 210.

The first conductive structure according to various embodiments may have a feeding connector and various ground connectors. The feeding connector and the ground connectors may be connected to a PCB or various conductive structures in the interior of the electronic device 201. Information on a manner in which the first conductive structure is operated as an antenna radiator may be provided through FIGS. 2, 3, 4, 5A and 5B, 6, 7, 8, 9, 10, 11, 12, and 13.

At least a portion of the display 220 according to various embodiments may be exposed to the outside through the through-hole of the outer housing 210. The exposed display 220 may have a form (for example, a circular form) corresponding to the shape of the through-hole. The display 220 may include an area that is exposed through the through-hole and an area that is seated inside the outer housing 210. A separate glass member may be attached to an area that is exposed through the through-hole. As another example, the display 220 may include a display panel (for example, an LCD panel or an OLED panel) that displays an image or a text and a panel (for example, a touch panel) that receives an input of the user. In various embodiments, the display 220 may be implemented by a one cell touch active matrix organic light emitting diode (AMOLED). The one cell touch AMOLED (OCTA) includes a touch panel and an AMOLED panel that are integrally coupled to each other.

According to various embodiments, the display 220 may include a second conductive structure that is implemented by a conductive material (for example, a metal). For example, the second conductive structure may be formed on a flexible printed circuit board (FPCB) included in the display 220, or may be formed in a separate shielding layer or a separate heat dissipating layer.

The second conductive structure according to various embodiments may be electrically connected to the first conductive structure included in the outer housing 210 or the PCB to be utilized as a part of an antenna. In various embodiments, the second conductive structure may include a plurality of conductive plates.

The rear cover 230 according to various embodiments may be coupled to the outer housing 210 to fix and protect an internal configuration. The rear cover 230 may be a non-metallic material or a non-conductive material. The rear cover 230 may prevent the outer housing 210 from contacting skin of the user and the like.

Figure 3:
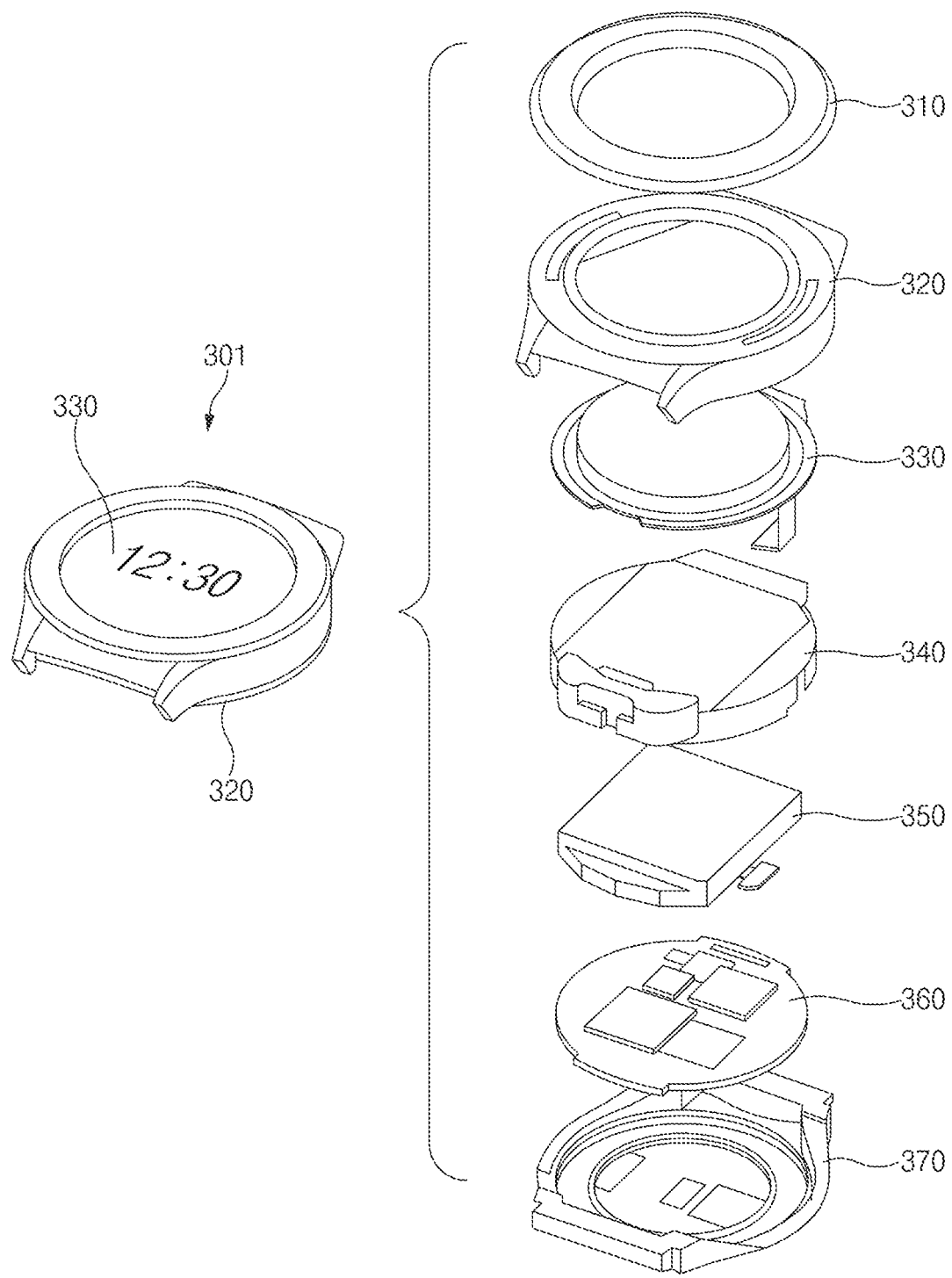
FIG. 3 illustrates a development view of an electronic device according to various embodiments of the present disclosure.

FIG. 3 illustrates a development view of an electronic device according to an embodiment of the present disclosure.

Referring to FIG. 3, an electronic device 301 may be the electronic device 101 of FIG. 1 or the electronic device 201 of FIG. 2. The electronic device 301 may include a bezel wheel 310, an outer housing 320, a display 330, a bracket 340, a battery 350, a PCB 360, and a rear cover 370.

The outer housing 320 according to various embodiments may protect various configurations (for example, the display 330, the battery 350, and the PCB 360) arranged inside the outer housing 320. In various embodiments, the outer housing 320 may include a bezel wheel 310 arranged at a periphery of a through-hole through which the display 330 is exposed. The bezel wheel 310 may interrupt an area of the display 330 under the bezel wheel from being exposed to the outside, and may generate a user input through rotation.

According to various embodiments, at least a portion of the outer housing 320 may include a first conductive structure implemented by a conductive material (for example, a metal). For example, the first conductive structure may be formed at an upper portion of the display 330 (for example, a periphery of the through-hole or a periphery of the bezel wheel 310), or may be formed at a portion of the same or similar height of the display 330 (for example, a side wall of the outer housing 320). Depending on a location of the first conductive structure according to various embodiments, characteristics of a corresponding resonance frequency may vary.

The display 330 according to various embodiments may have a plate shaped as a whole, and may output an image or a text. The display 330 according to various embodiments, for example, may be implemented in various types such as an LCD type, an OLED type, and an OCTA type. When the display 330 according to various embodiments includes a touch panel, the display 330 may receive a touch input of the user and provide the received touch input to a processor mounted on the PCB 360. In various embodiments, the display 330 may have various forms such as a circular form, an elliptical form, and a tetragonal form.

According to various embodiments, the display 330 may include a second conductive structure that is implemented by a conductive material (for example, a metal). For example, the second conductive structure may be formed on an FPCB included in the display 330, or may be formed in a separate shielding layer or a separate heat dissipating layer. The second conductive structure according to various embodiments may be connected to the first conductive structure of the outer housing 320 or the PCB 360 to constitute a part of a multiband antenna.

According to various embodiments, the display 330 may include a plurality of conductive plates (for example, an FPCB, a shielding layer, and a heat dissipating layer). The plurality of conductive plates may be connected to the PCB 360 to ensure a performance of an antenna. For example, a tail-shaped pattern may be withdrawn from the FPCB of the display 330, and the tail may be seated on the bracket 340 and be connected to one surface of the PCB 360. Connection of the plurality of conductive plates included in the display 330 and the PCB 360 may prevent the display 330 from acting as an interruption factor to transmission and reception of electric waves and allows the display 330 to be utilized in tuning of a resonance frequency. In various embodiments, the plurality of conductive plates may form at least a portion of the second conductive structure.

According to various embodiments, the display 330 may have a stack structure including a touch panel, a display panel, a bonding layer, and an FPCB. Information on the stack structure of the display 330 according to various embodiments may be provided through FIG. 7. In various embodiments, an NFC antenna (or an NFC coil) may be arranged inside the display 330.

The display 330 according to various embodiments may include signal lines for transmitting and receiving data to and from the PCB 360. A signal line related to supply of signals of the display panel (for example, an FPCB), a signal line related to supply of signals of the touch screen, a signal line for transmitting and receiving NFC signals, a signal line for grounding, and the like may be arranged in the display 330 while protruding.

The bracket 340 according to various embodiments may mount and fix the display 330, the battery 350, the PCB 360, and the like. The bracket 340 may mount and fix signal lines connecting the configurations. The bracket 340 may be implemented by a non-conductive material (for example, a plastic). In various embodiments, a conductive structure (for example, a conductive plate) may be provided on one surface of the bracket 340 (for example, a surface adjacent to the display 330). In various embodiments, the conductive structure may be connected to the PCB 360 to influence frequency resonance characteristics.

The battery 350 according to various embodiment may be mounted on the bracket 340, and may be electrically connected to the PCB 360. The battery 350 may be charged by an external power source, and may emit the charged power to drive the electronic device 301.

Modules or chips for driving the electronic device 301 may be mounted on the PCB 360 according to various embodiments. A processor, a memory, a communication module, and the like may be mounted on the PCB 360. In various embodiments, the PCB 360 may include a feeder that may supply electric power to the antenna radiator, and may include a separate ground part.

The feeder according to various embodiments may be connected to the first conductive structure of the outer housing 320. In this case, the first conductive structure may be operated as an antenna radiator, and may receive electric power from the PCB 360.

The ground part of the PCB 360 according to various embodiment may be connected to a plurality of conductive plates (for example, an FPCB, a shielding layer, and a heat dissipating layer) included in the display 330. Further, the ground part of the PCB 360 may be connected to the first conductive structure included in the outer housing 320.

The rear cover 370 according to various embodiments may be coupled to the outer housing 320 to fix and protect an internal configuration. The rear cover 370 may be a non-metallic material or a non-conductive material.

Figure 4:
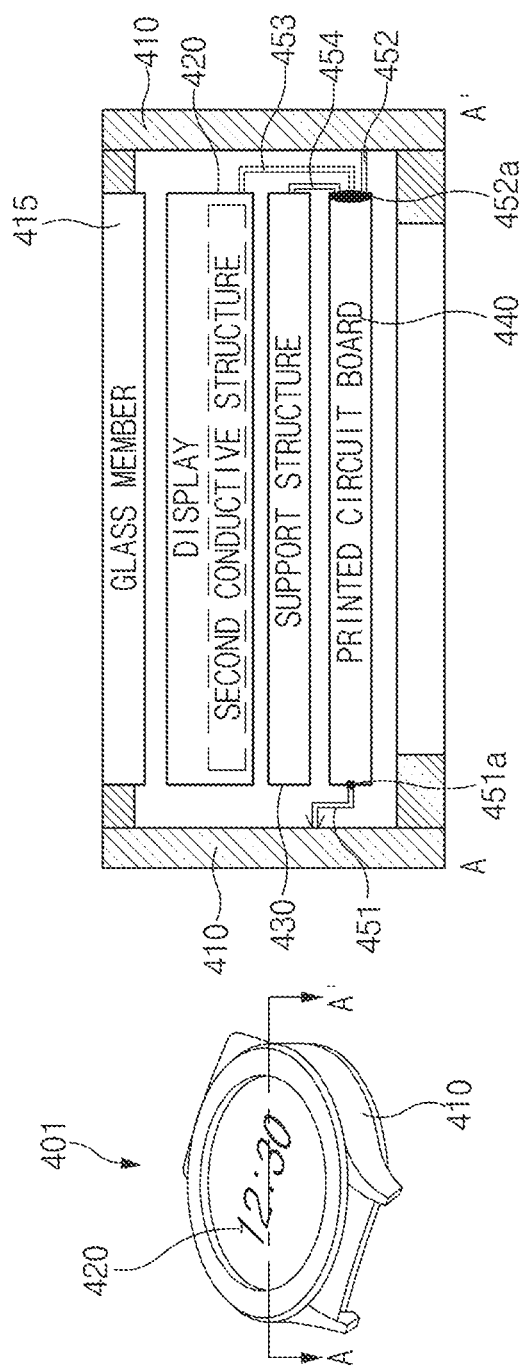
FIG. 4 illustrates a sectional view of an electronic device according to an embodiment of the present disclosure.

FIG. 4 illustrates a sectional view of an electronic device according to an embodiment of the present disclosure.

Referring to FIG. 4, the sectional view generally illustrates main elements related to an operation of an antenna, and additional configurations may be provided in the sectional view. An electronic device 401 may include an outer housing 410 and a display 420. In various embodiments, the electronic device 401 may include a whole part or a portion of the electronic device 101 of FIG. 1 or the electronic device 301 of FIG. 3.

The outer housing 410 may protect various configurations (for example, the display 420, the support structure 430, and the PCB 440) arranged inside the outer housing 410. A through-hole of a specific size may be arranged at the center of a first surface (front surface) of the outer housing 410 to define an opening. A glass member 415 may be arranged in the through-hole. The glass member 415 may prevent the display 420 from being directly exposed to the outside, and may protect the display 420. In various embodiments, the glass member 415 may be bonded to the display 420.

According to various embodiments, the outer housing 410 may include a first conductive structure at least at a portion thereof. The first conductive structure may be formed in the entire outer housing 410 or an area of the outer housing 410. The first conductive structure may be used as an antenna radiator for transmitting and receiving data to and from an external device. The first conductive structure according to various embodiments may be arranged at a periphery of the through-hole at an upper end of the display (an area adjacent to the glass member 415), and may be formed at a part of a height that is the same as or similar to that of the display 420 (for example, a side wall of the outer housing 410). Depending on a location of the first conductive structure, corresponding frequency resonance characteristics may vary.

When the outer housing 410 according to various embodiments is utilized as an antenna radiator, the outer housing 410 may be connected to a communication circuit mounted on the printed circuit 440 seated inside the outer housing 410 to transmit and receive signals. The size, shape, and curving of the outer housing 410 may be modified in various forms according to communication characteristics of the communication module. The outer housing 410 may be connected to a feeder 451a of the PCB 440 through a first conductive member 451. The feeder 451a may be connected to an RF circuit (or RF module) mounted on the PCB 440.

The outer housing 410 according to various embodiments may be connected to a feeder 452a of the PCB 440 through a second conductive member 452. In various embodiments, although FIG. 4 illustrates that the outer housing 410 includes one ground connector, the present disclosure is not limited thereto. For example, the outer housing 410 may include a plurality of ground connectors.

The first conductive member 451 or the second conductive member 452 according to various embodiments may be implemented by a metal plate having contact parts at opposite ends thereof. As another example, the contact parts may be bent in a resilient form. As another example, the first conductive member 451 or the second conductive member 452 may prevent deterioration of performance due to a tolerance or a deformation by an external impact.

At least a portion of the display 420 according to various embodiments may be exposed to the outside through the through-hole of the outer housing 410. In various embodiments, the display 420 may be implemented by a stack structure. For example, a touch panel, a display panel, and an FPCB for driving the display panel may be stacked in the display 420.

According to various embodiments, the display 420 may include a second conductive structure. The second conductive structure may define at least a portion of one layer of the stack structure of the display. For example, the second conductive structure may be formed at a portion of the FPCB.

The second conductive structure according to various embodiments may be connected to the PCB 440. The second conductive structure may be connected to the ground part 452a of the PCB 440 or connected to the first conductive structure of the outer housing 410 to adjust frequency resonance characteristics.

According to various embodiments, the display 420 may include a plurality of conductive plates. The plurality of conductive plates may be formed in a touch panel and/or an FPCB layer. The plurality of conductive plates may be connected to the PCB 440 to be utilized in tuning of resonance frequency. In various embodiments, the plurality of conductive plates may define at least a portion of the second conductive structure.

According to various embodiments, at least some of the plurality of conductive plates included in the display 420 may be connected to the PCB 440 through a third conductive member 453. In various embodiments, the third conductive member 453 may be a tail-shaped pattern connected to the plurality of conductive plates.

The support structure 430 according to various embodiments may be arranged between the display 420 and the PCB 440 to fix the display 420. At least a portion of the support structure 430 (hereinafter, the third conductive structure) may be implemented by a conductive material (for example, a metallic material). According to various embodiments, the third conductive structure may be a conductive plate that is coupled to an upper end surface of the bracket 340 of FIG. 3.

According to various embodiments, the support structure 430 may be connected to the PCB 440 through a fourth conductive member 454. For example, the fourth conductive member 454 may be a conductive pattern structure (for example, a stainless steel structure, a plating structure, a printing structure, a deposition structure, a dual injection-molding structure, or a laser direct structuring (LDS) structure) formed at a portion of a side surface of the support structure 430. The fourth conductive member 454 may be directly connected to the PCB 440 by deforming at least a portion of the support structure 430. The conductive pattern structure may be applied to a side surface of the support structure 430 or may be bonded to a side surface of the support structure 430 by using a conductive tape.

In various embodiments, the support structure 430 may be connected to the ground part of the PCB 440 or connected to the first conductive structure of the outer housing 410 to adjust frequency resonance characteristics.

Modules or chips for driving the electronic device 401 may be mounted on the PCB 440. A processor, a memory, a communication module, and the like may be mounted on the PCB 360. In various embodiments, the PCB 440 may include a communication circuit for communications, a control circuit, a feeder, and a ground part (or ground member).

In various embodiments, the PCB 440 may include a feeder 451a that may transfer a communication signal to the antenna radiator, and may include a ground part 452a. The feeder 451a of the PCB 440 may transfer a communication signal to a first point (a feeding connector) through the first conductive member 451 of the outer housing 410. The ground part 452a (or ground member) of the PCB 440 may be connected to a second point (a ground connector) of the outer housing 410 through the second conductive member 452. The second conductive member 452 may be the same as or similar to the first conductive member 451.

According to various embodiments, the PCB 440 may be connected to the display 420 (or the second conductive structure hereinafter) through the third conductive member 453. For example, the third conductive member 453 may be withdrawn from an FPCB, on which components of the display 420 are mounted, in a tail form. The third conductive member 453 may be seated on the bracket, and may contact one surface of the PCB 440.

According to various embodiments, the PCB 440 may be connected to the support structure 430 (or the third conductive structure hereinafter) through the fourth conductive member 454.

Figure 5A:
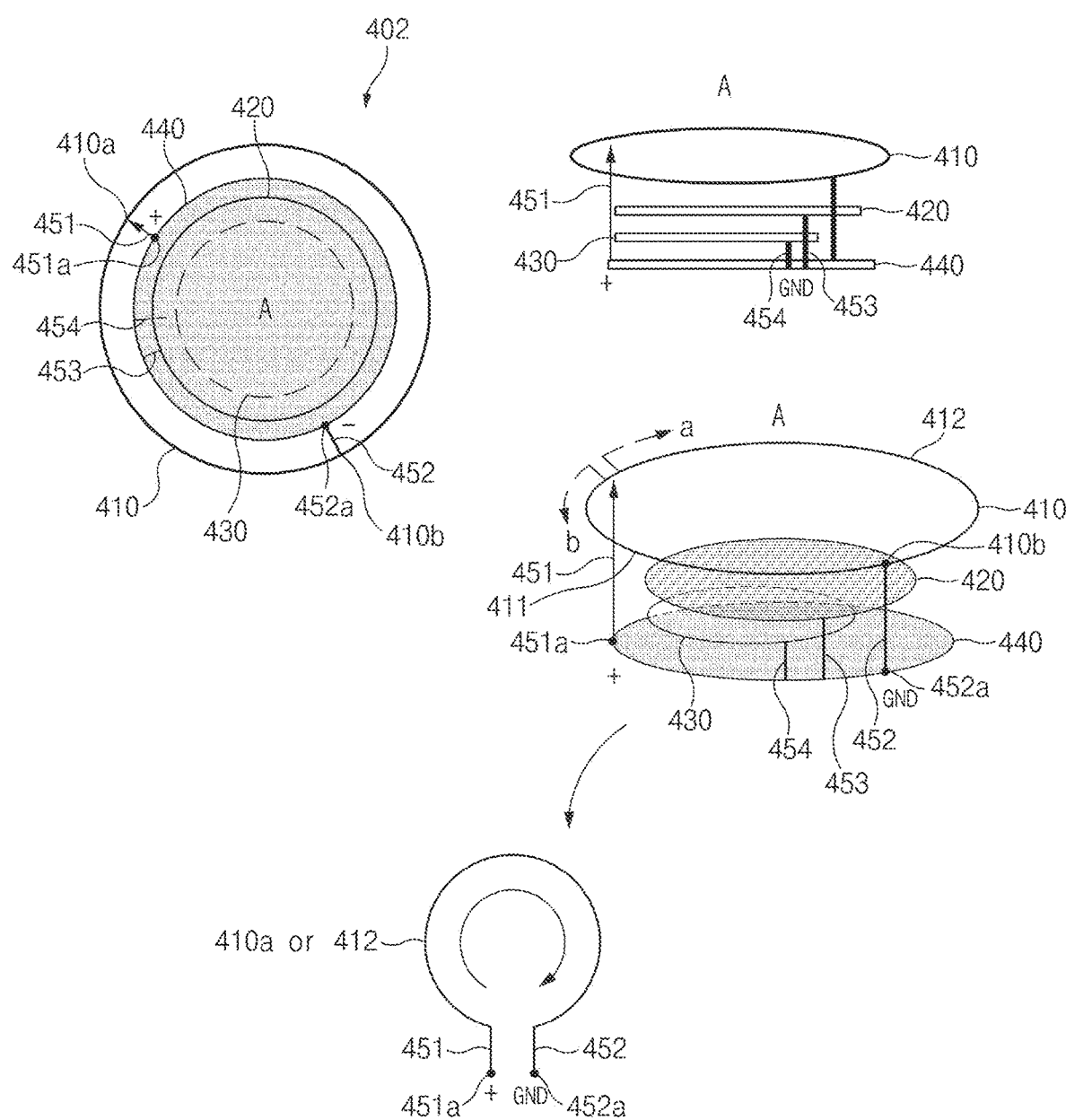
FIG. 5A illustrates an electronic device including a plurality of conductive structures according to an embodiment of the present disclosure.

FIG. 5A illustrates an electronic device including a plurality of conductive structures according to an embodiment of the present disclosure.

Referring to FIG. 5A, for example, an electronic device 402 may include a whole part or a portion of the electronic device 301 of FIG. 3 or the electronic device 401 of FIG. 4. For example, the electronic device 402 of FIG. 5A may include all or some of the outer housing 410, the display 420, the support structure 430, and the PCB 440.

The outer housing 410 (or the first conductive structure included in the outer housing 410 hereinafter) may surround the display 420, the support structure 430, and the PCB 440. In various embodiments, the first conductive structure (a conductive material part of the outer housing 410) may be arranged on the upper side of the display 420 and the PCB 440 towards a front surface (in a direction towards A) of the electronic device 402. The first conductive structure may include a whole part or a portion of a side surface of the outer housing 410 as in FIG. 4, and may include only a portion of the outer housing 410 as in FIG. 5A. Hereinafter, a first conductive structure may be briefly expressed to explain the feeder and the ground part of the antenna.

According to various embodiments, when the electronic device 402 is viewed from the front surface (surface A) through which the display 420 is exposed to the outside, the support structure 430 (for example, the bracket 340 of FIG. 3) and the PCB 440 may be arranged under the display 420.

According to various embodiments, the outer housing 410 may be connected to the feeder 451a of the PCB 440 through the first conductive member 451 at the first point (the feeding connector) 410a. The feeder 451a may be connected to an RF communication circuit/module on the PCB 440. In various embodiments, the first conductive member 451 may be generally formed of a metal, and may include a resilient structure (for example, a C-clip, a spring, a plate spring, conductive sponge, a screw, or a spring washer) in some regions. For example, the first conductive member 451 may have resiliency in two or more directions. The first conductive member 451 may be assembled in the bracket, and may further include an assembly part for fixation. A first end of the first conductive member 451 according to various embodiments may contact the outer housing 410, and a second end of the first conductive member 451 may contact the feeder 451a of the PCB 440.

According to various embodiments, the outer housing 410 may include at least one ground connector (for example, the second point 410b) connected to the ground part. The ground connector may be connected to the ground part 452a of the PCB 440 through the second conductive member 452. In various embodiments, the second conductive member 452 may have a material or form that is the same as or similar to that of the first conductive member 451.

The electronic device 402 according to various embodiments may be operated as a multiband antenna having one feeder and one or more ground parts. For example, in the electronic device 402, a radiator may be expanded in a first direction (for example, direction a) and in a second direction (for example, direction b) with respect to the first point (the feeding connector) 410a.

The electronic device 402 according to various embodiment may generate a multi-loop resonance.

A first route is formed at the first point 410a of the outer housing 410 along direction a to form a resonance. If a distance from the first point 410a to the second point 410b in direction a becomes larger, a frequency signal of a relatively low frequency band may be transmitted and received, and if the distance becomes smaller, a frequency signal of a relatively high frequency band may be transmitted and received.

In one of various embodiments, in the outer housing 410, a second route starts from the feeder 451a and proceeds in direction b via the first point 410a to form a resonance. If a distance from the first point 410a to the second point 410b in direction b becomes larger, starting from the feeder 451a, a frequency signal of a relatively low frequency band may be transmitted and received, and if the distance becomes smaller, a frequency signal of a relatively high frequency band may be transmitted and received.

The electronic device 402 may be operated as loop antennas in direction a and direction b, respectively. In various embodiments, a first route including the feeder 451a of the PCB 440, the first point (the feeding connector), the direction a radiator 412, the second point (the ground connector) 410b, and the ground part 452a of the PCB 440 may be operated as a radiator of the loop antenna. The length of the first route may be the length ($\lambda/2$, $\lambda$ is a wavelength) of the loop antenna. Similarly, a second route including the feeder 451a of the PCB 440, the first point (the feeding connector), the direction b radiator 411, the second point (the ground connector) 410b, and the ground part 452a of the PCB 440 may be operated as a radiator of the loop antenna. The length of the second route may be the length ($\lambda/2$, $\lambda$ is a wavelength) of the loop antenna.

According to various embodiments, the PCB 440 may be connected to the display 420 and the support structure 430. Through the connection, the display 420 and the support structure 430 may be prevented from acting as an interruption factor to transmission and reception of electric waves.

Further, through the connection, the display 420 and the support structure 430 may be used to tune (or finely adjust) resonance frequency.

The PCB 440 may be connected to the display 420 through the third conductive member 453. In various embodiments, at least a portion of the FPCB of the display 420 may be connected to the ground part of the PCB 440. For example, the third conductive member 453 may be withdrawn from an FPCB, on which components of the display 420 are mounted, in a tail form. The third conductive member 453 may be seated on the bracket, and may contact one surface of the PCB 440. In various embodiments, the third conductive member 453 may include a signal line that transfers image information to the display 420 and adjusts the display 420, and may be an FPCB form.

The PCB 440 may be connected to the support structure 430 through the fourth conductive member 454. According to various embodiments, the support structure 430 may be a stainless steel layer attached to one surface of the bracket 340 of FIG. 3. The support structure 430 may have a form of a conductive plate. In various embodiments, the support structure 430 may include a conductive pattern structure (for example, a stainless steel structure, a plating structure, a printing structure, a deposition structure, a dual injection-molding structure, or a laser direction structuring (LDS) structure) that is connected to the PCB 440. The conductive pattern structure may be formed by applying a conductive material to a portion of a side surface of the support structure 430.

Figure 5B:
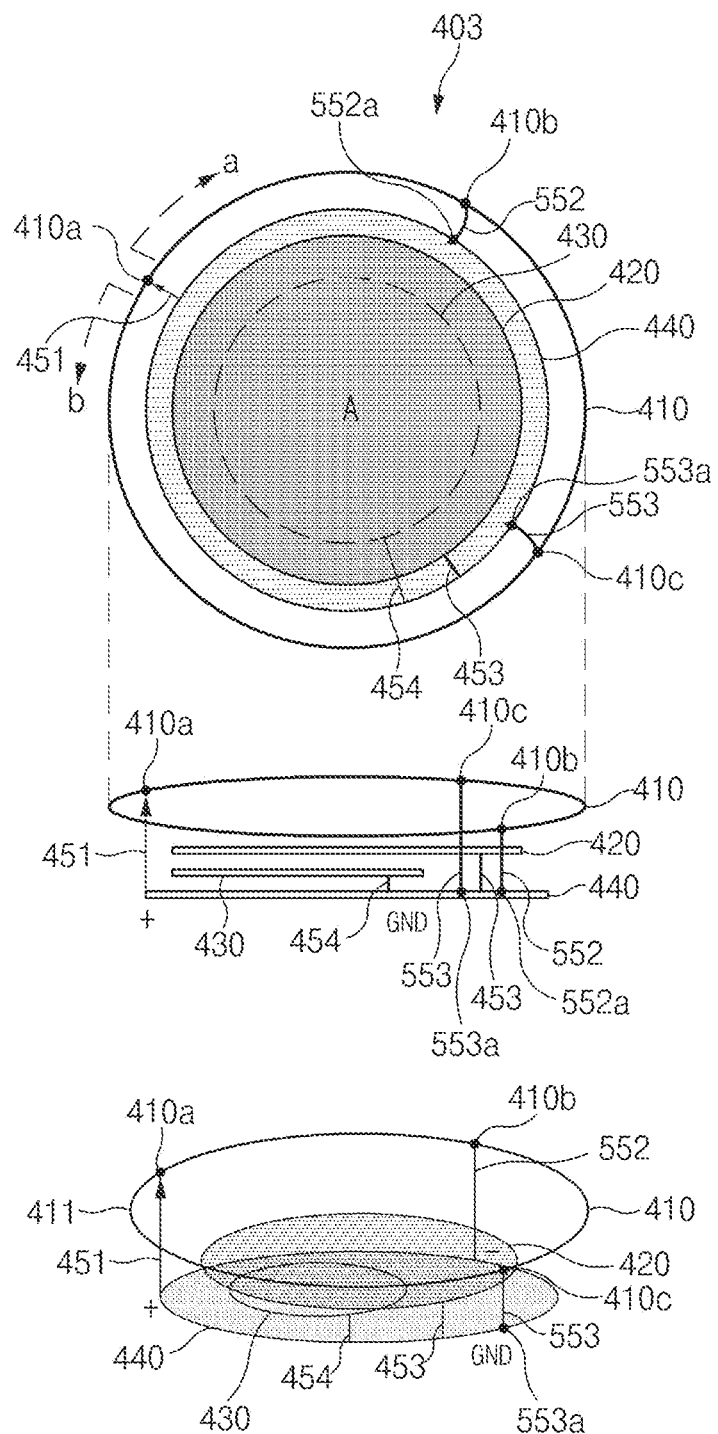
FIG. 5B illustrates an electronic device having a plurality of ground connectors according to an embodiment of the present disclosure.

FIG. 5B illustrates an electronic device having a plurality of ground connectors according to an embodiment of the present disclosure.

Referring to FIG. 5B, for example, an electronic device 403 may include a whole part or a portion of the electronic device 301 of FIG. 3 or the electronic device 401 of FIG. 4. For example, the electronic device 403 of FIG. 5B may include all or some of the outer housing 410, the display 420, the support structure 430, and the PCB 440.

The outer housing 410 may be connected to the feeder 451a of the PCB 440 through the first conductive member 451 at the first point (the feeding connector) 410a.

According to various embodiments, the outer housing 410 may include a plurality of ground connectors (for example, the second point 410b and the third point 410c) connected to the ground part. The plurality of ground connectors may be connected to the ground parts 552a and 553a of the PCB 440 through the second conductive members 552 and 553, respectively. In various embodiments, the second conductive members 552 and 553 may have a material or form that is the same as or similar to that of the first conductive member 451.

According to various embodiments, the electronic device 403 may be operated as one loop antenna along a first route in direction a (including the feeder 451a of the PCB 440, the first conductive member 451, the first point 410a, the second point 410b, the second conductive member 552, and the ground part 552a of the PCB 440), and may transmit and receive a first frequency signal.

According to various embodiments, the electronic device 403 may be operated as one loop antenna along a second route in direction b (including the feeder 451a of the PCB 440, the first conductive member 451, the first point 410a, the third point 410c, the third conductive member 553, and the ground part 553a of the PCB 440), and may transmit and receive a second frequency signal.

The electronic device 403 according to various embodiments may be operated as a multiband antenna having one feeder and two or more ground parts. For example, in the antenna 402, a radiator may be expanded in a first direction (for example, direction a) and in a second direction (for example, direction b) with respect to the first point (the feeding connector) 410a. The electronic device 403 may generate a multi-loop resonance.

Figure 6:
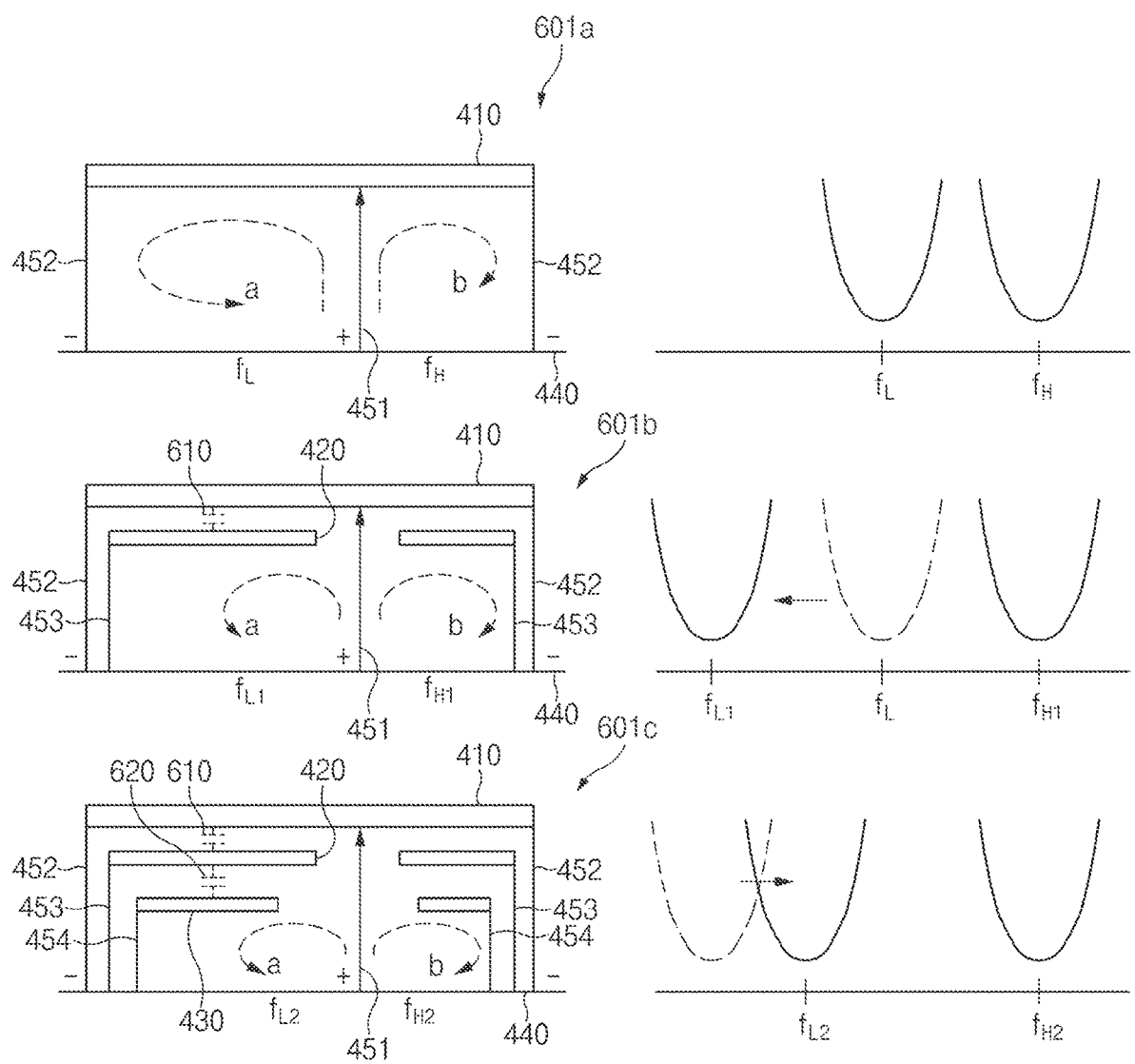
FIG. 6 illustrates resonance characteristics of an electronic device including a plurality of conductive structures according to an embodiment of the present disclosure.

FIG. 6 illustrates resonance characteristics of an electronic device including a plurality of conductive structures according to an embodiment of the present disclosure.

Referring to FIG. 6, electronic devices 601a to 601c are the conceptual illustrations of the electronic device 401 of FIG. 4 or FIG. 5A, but the present disclosure is not limited thereto. In various embodiments, the electronic devices 601a to 601c may include a whole part or a portion of the electronic device 301 of FIG. 3 or the electronic device 401 of FIG. 4. The electronic device 601a may transmit and receive a multiband frequency signal by using the outer housing 410. The outer housing 410 may be connected to the feeder of the printed circuit board 440 to feed electric power. In various embodiments, the outer housing 410 may be connected to the ground part of the PCB 440 to be grounded.

In the electronic device 601a, a separate conductive structure (for example, the display 420 or the support structure 430) may not be arranged in an area adjacent to the outer housing 410. The electronic device 601a may not be influenced by resonance characteristics due to a conductive structure around the outer housing 410. The electronic device 601a may transmit and receive a signal of a first frequency band $f_L$ (for example, 1000 to 1500 MHz) due to a resonance in direction a, and may transmit and receive a signal of a second frequency band $f_H$ (for example, 1700 to 2100 MHz) due to a resonance in direction b.

A display 420 may be arranged in the electronic device 601b in an area adjacent to the outer housing 410. The display 420 may be connected to the PCB 440 to be used to tune frequency. In various embodiments, the display 420 may be connected to the ground part of the PCB 440.

The electronic device 601b may transmit and receive a signal of a first frequency band $f_{L1}$ (for example, 650 to 800 MHz) due to a resonance in direction a, and may transmit and receive a signal of a second frequency band $f_{H1}$ (for example, 1700 to 2100 MHz) due to a resonance in direction b.

The display 420 may include a conductive structure to influence resonance characteristics of the outer housing 410. In various embodiments, the outer housing 410 and the display 420 may be electrically connected to each other through the PCB 410, and a first capacitor component 610 may be formed through electromagnetic coupling. The resonance frequency band may be changed by the first capacitor component 610. For example, when a conductive structure of the display 410 connected to the ground part of the PCB 430 approaches the outer housing 410 used as an antenna radiator, the first capacitor component 610 may be formed between the display 420 and the outer housing 410 to lower the resonance frequency from $f_L$ to $f_{L1}$.

According to various embodiments, an influence of the first capacitor component 610 may be greater at the first frequency band $f_{L1}$ that requires a large area of the outer housing 410 for a resonance at a relatively low frequency band. The outer housing 410 may be influenced more greatly by the display 420 at the first frequency band $f_{L1}$ that is a low frequency band.

A display 420 and a support structure 430 may be arranged in the electronic device 601c in an area adjacent to the outer housing 410. The display 420 and the support structure 430 may be connected to the PCB 440 to be used to tune frequency. In various embodiments, the display 420 and the support structure 430 may be connected to the ground part of the PCB 440.

The electronic device 601c may transmit and receive a signal of a first frequency band $f_{L2}$ (for example, 800 to 960 MHz) due to a resonance in direction a, and may transmit and receive a signal of a second frequency band $f_{H2}$ (for example, 1700 to 2100 MHz) due to a resonance in direction b. The display 420 and the support structure 430 may include conductive structures, respectively, and may influence resonance characteristics of the outer housing 410. In various embodiments, the outer housing 410 and the display 420 may be electrically connected to each other through the PCB 410, and a first capacitor component 610 may be formed through electromagnetic coupling. A second capacitor component 620 may be formed between the display 420 and the support structure 430. The resonance frequency band may be changed by the first capacitor component 610 and the second capacitor component 620. For example, when the display 420 and the outer housing 410 are exposed to the outside more, a method of adjusting the first capacitor component 610 may be used to increase the resonance frequency of the first frequency band $f_{L2}$ changed due to the first capacitor component 610 by a specific range. However, when the outer housing 410 and the display 420 are exposed to the outside or are commonly used such that the structure thereof cannot be easily changed, the second capacitor component 620 may be added to change the resonance frequency without changing the form of the display 420.

According to various embodiments, an influence of the first capacitor component 610 and the second capacitor component 620 may be greater at the first frequency band $f_{L2}$ that requires a large area of the outer housing 410 for a resonance at a relatively low frequency band. The outer housing 410 may be influenced more greatly by the display 420 or the support structure 430 at the first frequency band $f_{L2}$ that is a low frequency band.

The entire capacitor value may be made to be smaller than the first capacitor component 610 by connecting the first capacitor component 610 and the second capacitor component 620 in parallel. When the resonance frequency f is determined in the following equation, the resonance frequency becomes higher as the capacitance value C becomes smaller. The resonance frequency $f_{L2}$ at a low frequency band may be made to be higher than the resonance frequency $f_{L1}$ in the electronic device 601b by connecting the first capacitor component 610 and the second capacitor component 620 in parallel.

$$f=1/(2\pi\sqrt{LC}) \quad \text{Equation 1}$$

In the design process, the capacitance values of the first capacitor component 610 and the second capacitor component 620 may be adjusted for tuning of the resonance frequency. The size and distance of the display 420 or the support structure 430 may be adjusted, and the capacitance values of the first capacitor component 610 and the second capacitor component 620 may be adjusted or changed.

Figure 7:
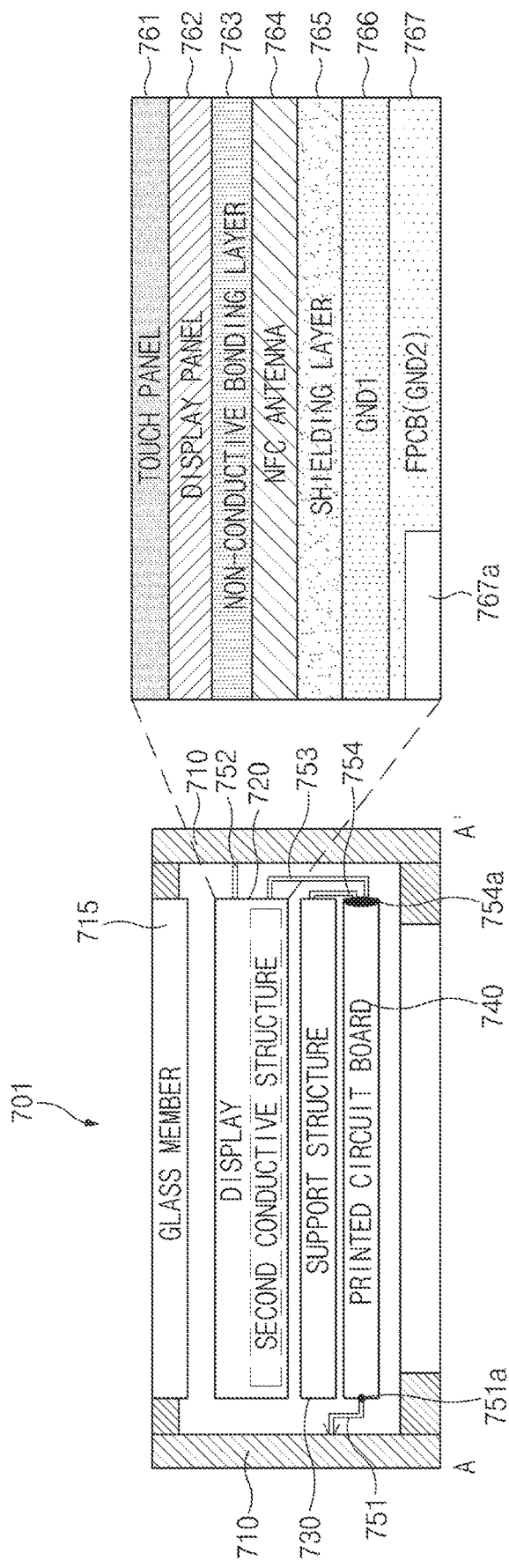
FIG. 7 illustrates a display including a plurality of ground plates according to an embodiment of the present disclosure.

FIG. 7 illustrates a sectional view of a display according to an embodiment of the present disclosure.

Referring to FIG. 7, an electronic device 701 may be a whole part or a portion of the electronic device 101 of FIG. 1 or the electronic device 301 of FIG. 3. The electronic device 701 may include an outer housing 710, a glass member 715, a display 720, a support structure 730, and a PCB 740. The outer housing 710 is connected to a feeder 751a and may receive electric power through the first conductive member 751, and may be connected to the ground through a second conductive member 752. The display 720 and the support structure 730 may be connected to the ground of the PCB 740 through a third conductive member 753 and a fourth conductive member 754; the third conductive member 753 and the fourth conductive member 754 are connected to a feeder 754a.

The display 720 may include a touch panel (GND 0) 761, a display panel 762, a non-conductive bonding layer 763, an NFC antenna 764, a shielding layer 765, an additional ground layer (GND 1) 766, and an FPCB (GND 2) 767.

The touch panel 761 may detect a touch input (or a touch pen input) of the user. The touch panel 761 may provide a change of a signal (for example, a change in capacitance) due to a touch input to the PCB 740. In various embodiments, the touch panel 761 may include a touch signal line directly connected to the PCB 740. In various embodiments, the touch panel 761 may be connected to the ground part of the PCB 740, and may be operated as a ground layer (GND 0).

The display panel 762 may output an image or a text. The display panel 762 may be connected to an FPCB 767 through a signal line that transmits and receives data.

The non-conductive bonding layer 763 may be arranged between the display 762 and the NFC antenna 764, and may be implemented by a non-conductive material.

The NFC antenna 764 may include an NFC coil and an NFC signal line connected to the coil. The NFC coil may transmit and receive an NFC related signal, and the NFC signal line may provide the signal to the PCB 740.

The shielding layer 765 may interrupt an influence of electromagnetic waves that may be generated in the NFC antenna 764.

The additional ground layer (GND 1) 766 may be connected to a metallic element (for example, a driver chip) included in the display 720 to form a ground part that is necessary for driving the display 720. In various embodiments, the additional ground layer (GND 1) 766 may be connected to the ground part of the PCB 740.

Modules or chips that are necessary for driving the display panel 720 may be mounted on the FPCB 767. According to various embodiments, the FPCB 767 may be connected to the ground part of the PCB 740 to be operated as a ground part (GND 2). In various embodiments, the FPCB 767 may include a ground part 767a. The ground part 767a may be an area including a conductive material, which is separated from an area to which chips and modules of the FPCB are attached.

According to various embodiments, the touch panel (GND 0) 761, the additional ground layer (GND 1) 766, and the FPCB (GND 2) 767 may be connected to a ground part of the PCB 740 to be used to tune resonance frequency.

Figure 8:
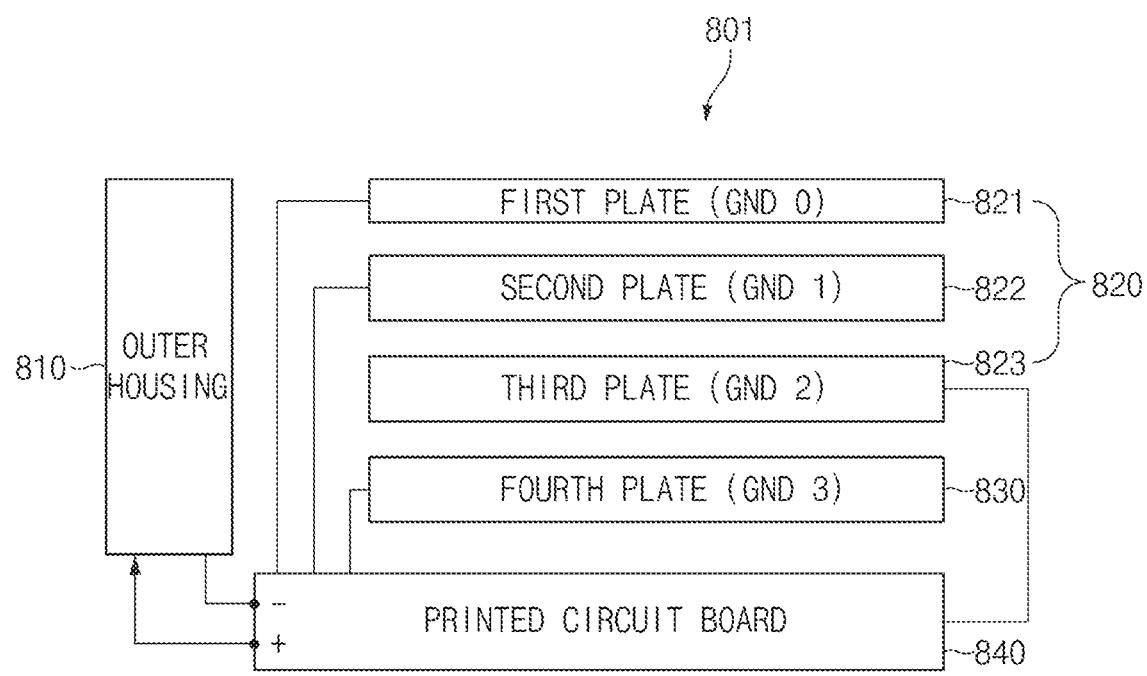
FIG. 8 is a diagram of an electronic device having a plurality of ground layers according to an embodiment of the present disclosure.

FIG. 8 is a diagram of an electronic device having a plurality of ground layers according to an embodiment of the present disclosure.

Referring to FIG. 8, an electronic device 801 may be the electronic device 101 of FIG. 1, the electronic device 301 of FIG. 3, or the electronic device 701 of FIG. 7. The electronic device 801 may include an outer housing 810, a plurality of ground layers (a first plate (GND 0) 821, a second plate (GND 1) 822, a third plate (GND 2) 823, and a fourth plate (GND 3) 830), and a PCB 840.

The outer housing 810 may be connected to a feeder of the PCB 840 at a first point to receive electric power, and may be connected to the feeder of the PCB 840 at a second point to be connected to the ground.

According to various embodiments, the first plate (GND 01) 821, the second plate (GND 1) 822, and the third plate (GND 2) 823 of the plurality of ground layers may be ground layers included in a display 820. For example, the first plate (GND 0) 821 may be a conductive plate included in the touch panel 761 as in FIG. 7, and the second plate (GND 1) 822 may correspond to the additional ground layer (GND 1) included in the display of FIG. 7. The third plate (GND 2) 823 may be a conductive plate included in the FPCB (GND 2) 767 of FIG. 7. The fourth plate (GND 3) 830 of the plurality of ground layers may be a stainless steel layer included in the support structure of FIG. 7.

As one of various embodiments, the sequence of the first plate (GND 0) 821, the second plate (GND 1) 822, the third plate (GND 2) 823, and the fourth plate (GND 3) 830 is not limited to the sequence of the plates according to the current location, but may be changed.

The plurality of ground layers may be connected to a ground part of the PCB 840. While the outer housing 810 transmits and receives a signal of a specific frequency band, the plurality of ground layers may not be operated as an interruption element factor to transmission and reception of electric waves, but may be used for a stable communication performance.

According to various embodiments, the plurality of ground layers may be used to tune resonance frequency. At least one capacitor may be formed between adjacent layers, and resonance characteristics change according to the change in capacitance vale of the capacitor. In a process of designing an antenna, resonance frequency may be shifted to a necessary frequency band by adjusting the capacitance value. The frequency resonance characteristics of FIG. 6 may be applied to the interfaces between the plurality of ground layers.

Figure 9:
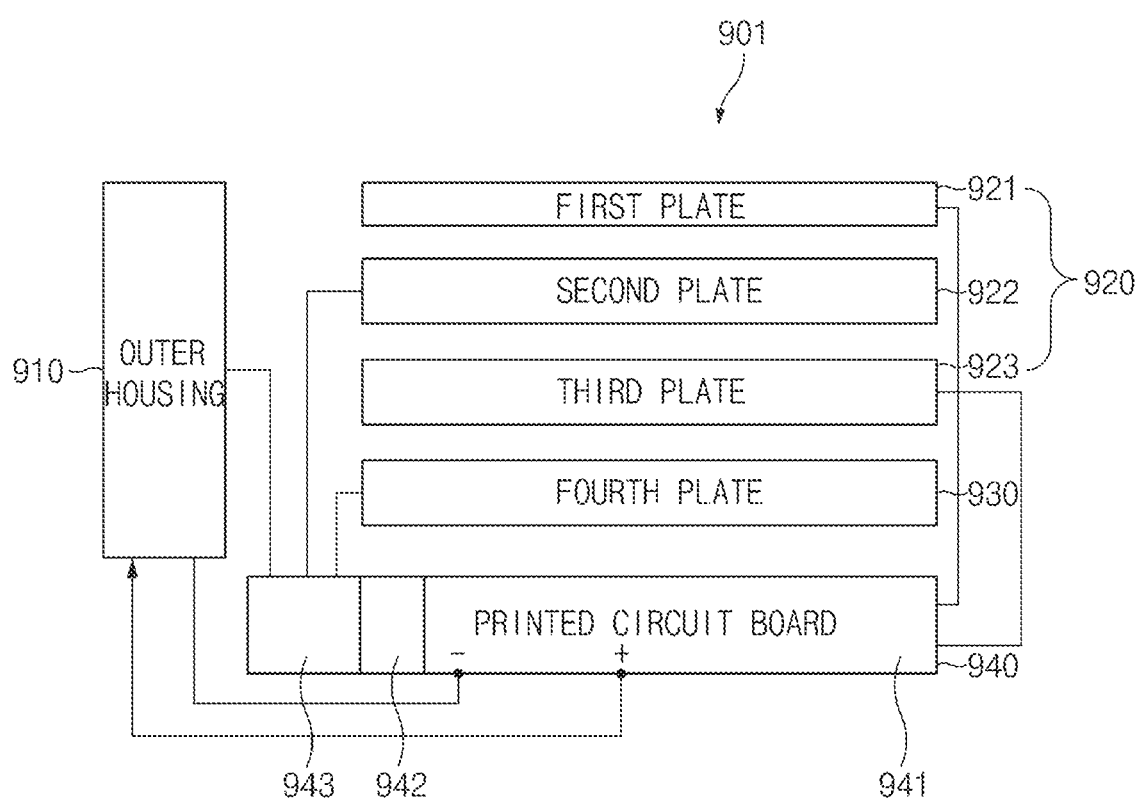
FIG. 9 is a diagram of an electronic device including a printed circuit board (PCB) having an isolation area according to an embodiment of the present disclosure.

FIG. 9 is a diagram of an electronic device including a PCB having an isolation area according to an embodiment of the present disclosure.

Referring to FIG. 9, an electronic device 901 may be the electronic device 101 of FIG. 1, the electronic device 301 of FIG. 3, or the electronic device 701 of FIG. 7. The electronic device 901 may include an outer housing 910, a plurality of ground layers (a first plate 921, a second plate 922, a third plate 923, and a fourth plate 930), and a PCB 940.

The outer housing 910 may be connected to a feeder of the PCB 940 at a first point to receive electric power, and may be connected to the feeder of the PCB 940 at a second point to be connected to the ground.

The PCB 940 may include a general area 941, an insulation area 942, and an isolation area 943.

The general area 941 may be an area on which chips or modules are mounted. A communication circuit, a control circuit, a feeder, and a ground part may be mounted on the general area 941.

The insulation area 942 may be arranged between the general area 941 and the isolation area 943. The insulation area 942 may be implemented by an insulation material, and may electrically isolate the general area 941 and the isolation area 943.

The isolation area 943 is an area that is electrically isolated from the general area 941, and may be implemented by a conductive material.

The plurality of plates (the first plate 921, the second plate 922, the third plate 923, and the fourth plate 930) may be connected to the general area 941 or the isolation area 943 of the PCB 940. Although FIG. 9 illustrates that the first plate 921 and the third plate 923 are connected to a ground part of the general area 941 of the PCB 940 and the second plate 922 and the fourth plate 930 are connected to the isolation area 943, the present disclosure is not limited thereto. In various embodiments, the sequence of the plurality of plates may be changed.

The plates (for example, the first plate 921 and the third plate 923) connected to a ground part of the general area 941 of the PCB 940 may be operated as an expanded ground area.

The plates (for example, the second plate 922 and the fourth plate 930) connected to the isolation area 943 of the PCB 940 may be connected to the outer housing to be operated as an expanded radiator. For example, the second plate 922 and the fourth plate 930 may define a separate stub connected to the outer housing 910.

According to various embodiments, in a process of designing an antenna, resonance frequency may be tuned by changing the connection locations and areas of the plurality of plates.

Figure 10:
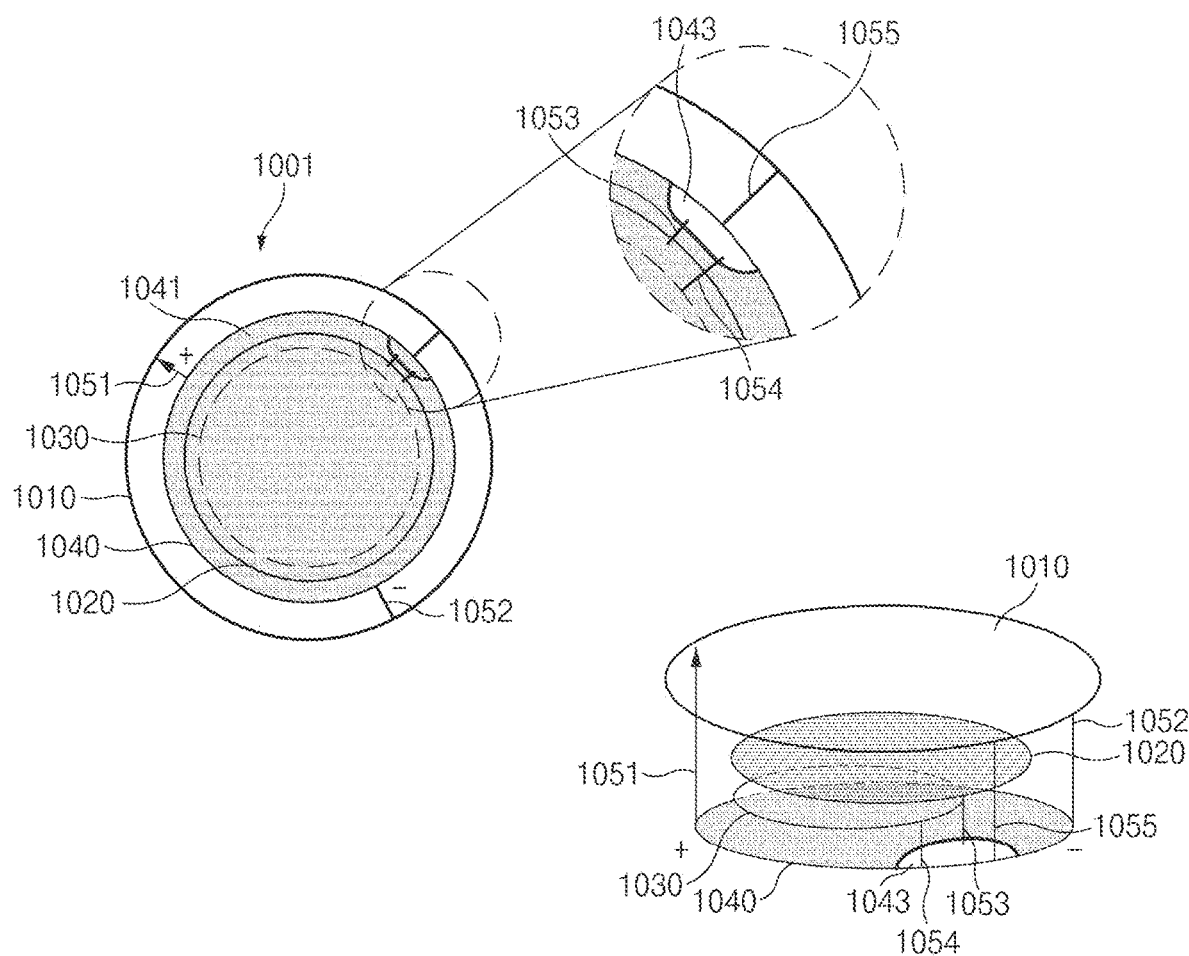
FIG. 10 illustrates an electronic device including a PCB having an isolation area according to an embodiment of the present disclosure.

FIG. 10 illustrates an electronic device including a PCB having an isolation area according to an embodiment of the present disclosure. The electronic device 1001 may be the electronic device 101 of FIG. 1, the electronic device 301 of FIG. 3, or the electronic device 901 of FIG. 9.

Referring to FIG. 10, an electronic device 1001 may be the electronic device 101 of FIG. 1, the electronic device 301 of FIG. 3, or the electronic device 901 of FIG. 9. The electronic device 1001 may include an outer housing 1010, a first conductive plate 1020, a second conductive plate 1030, and a PCB 1040.

The outer housing may be connected to a feeder of the PCB 1040 through a first conductive member 1051, at a first point. The outer housing may be connected to a ground part of the PCB 1040 through a second conductive member 1052, at a second point. The feeder and the ground part of the PCB 1040 may be included in a general area 1041.

The first conductive plate 1020 and the second conductive plate 1030 may be connected to the outer housing 1010 through the isolation area 1043 of the PCB 1040. The first conductive plate 1020 and the second conductive plate 1030 may be connected to the isolation area 1043 through the third conductive member 1053 and the fourth conductive member 1054, respectively. The isolation area 1043 of the PCB 1040 may be connected to the outer housing 110 through a fifth conductive member 1055. The first conductive plate 1020 and the second conductive plate 1030 may define a stub connected to the outer housing 1010.

Figure 11:
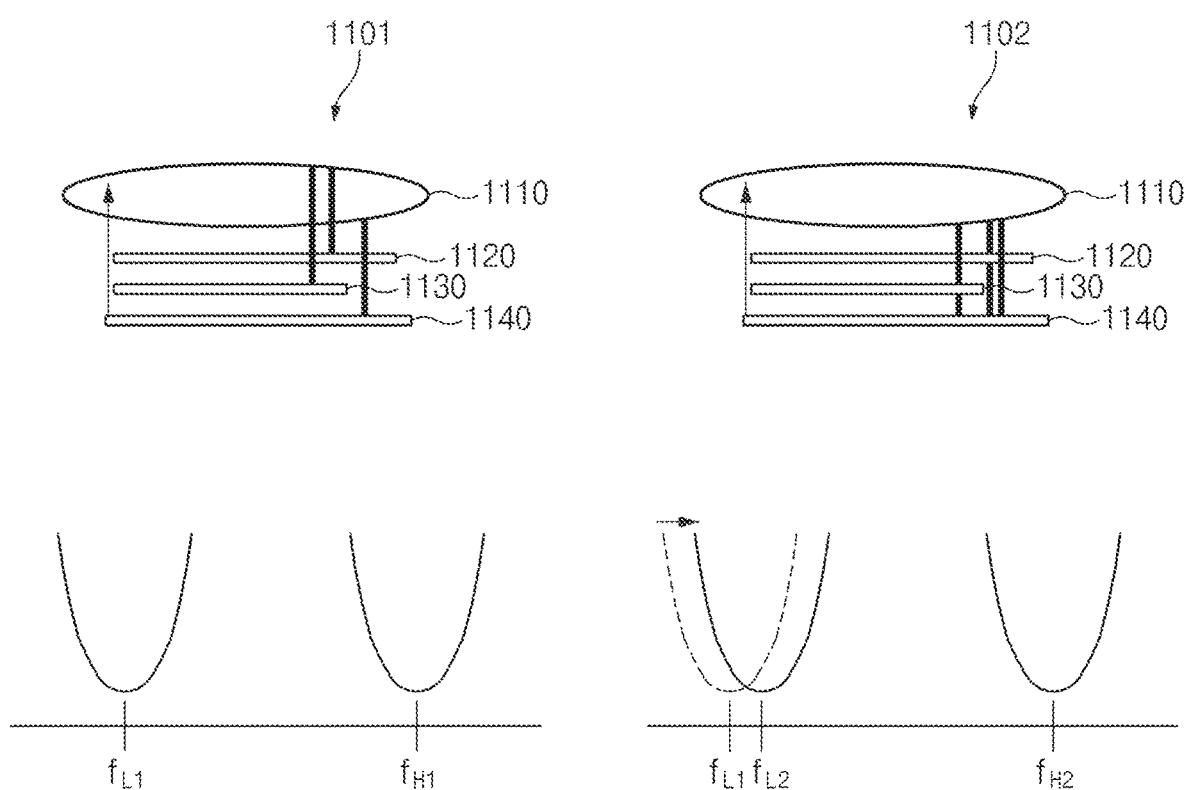
FIG. 11 is a graph depicting a change in resonance frequency through an isolation area according to an embodiment of the present disclosure.

FIG. 11 is a graph depicting a change in resonance frequency through an isolation area according to an embodiment of the present disclosure.

Referring to FIG. 11, an electronic device 1101 may be the electronic device 1001 of FIG. 10. The electronic device 1101 may have a form in which an antenna radiator is expanded through an isolation area of a PCB. The electronic device 1101 may transmit and receive signals of a first frequency band $f_{L1}$ and a second frequency band $f_{H1}$.

The electronic device 1102 may not include a separate isolation area in the PCB. The electronic device 1102 may have a form in which the plurality of conductive plates is connected to a ground part of the PCB. The electronic device 1102 may transmit and receive signals of a first frequency band $f_{L2}$ and a second frequency band $f_{H2}$.

In the electronic device 1101, the conductive plate corresponding to the display 1120 and the support structure 1130 may extend as an antenna radiator. In this case, in the electronic device 1101, the electrical resonance length of the antenna becomes longer such that the antenna may be operated at a first frequency band $f_{L1}$ at which resonance frequency is relatively low.

In the electronic device 1102, the conductive plate corresponding to the display 1120 and the support structure 1130 may be grounded to the PCB 1140 to be operated as a part of a ground part instead of an extension of an antenna radiator. Further, the conductive plate corresponding to the display 1120 and the support structure 1130 may be also connected the antenna radiator while being grounded to the PCB 1140. The conductive plate may form a first frequency band $f_{L2}$ having a relatively high resonance frequency by forming first and second capacitances instead of being used as an existing extending radiator.

In various embodiments, the electronic device 1101 or the electronic device 1102 may connect a conductive plate arranged adjacent to the outer housing at various locations such as the outer housing, a ground part of the PCB, and the isolation area of the PCB. The conductive plate may be used to tune resonance frequency. The resonance frequency may be shifted to a necessary frequency band by changing the area and connection location of the conductive plate.

Figure 12:
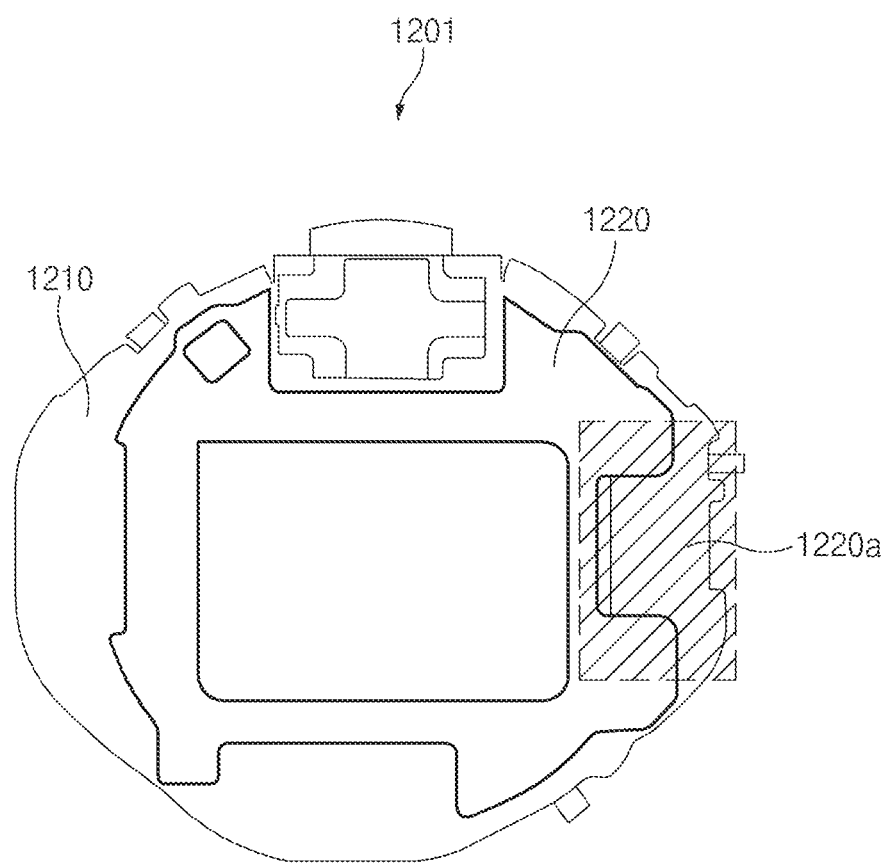
FIG. 12 illustrates a support structure according to an embodiment of the present disclosure.

FIG. 12 illustrates a support structure according to an embodiment of the present disclosure.

Referring to FIG. 12, a support structure 1201 may include a whole part or a portion of the support structure of FIGS. 3, 4, 5A and 5B, 6, 7, 8, 9, 10 and 11. The support structure 1201 may include a bracket 1210 and a conductive structure layer 1220.

The bracket 1210 may fix and mount a display and a printed circuit included in the electronic device. The bracket 1210 may fix and mount signal lines that connect the display and the PCB. The conductive structure layer 1220 may be mounted on one surface of the bracket 1210 (for example, a surface on which the display is mounted).

The conductive structure layer 1220 may be implemented by a conductive material. The conductive structure layer 1220 may fix the display. The form of the conductive structure layer 1220 may vary according to an arrangement form of peripheral components or signal lines. In various embodiments, the conductive structure layer 1220 may be a form of a conductive plate of not less than a specific area.

According to various embodiments, a portion of a side area of the conductive structure layer 1220 may define a conductive pattern structure (for example, a stainless steel structure, a plating structure, a printing structure, a deposition structure, a dual injection-molding structure, a laser direct structuring (LDS) structure) 1220a. The conductive pattern structure 1220a may be applied to a side area of the conductive structure layer 1220 and a surface of the bracket adjacent to the side area or may be bonded to them by using a conductive tape. The conductive structure layer 1220 may be connected to the PCB through the conductive pattern structure 1220a. For example, the conductive structure layer 1220 may be connected to a ground part of the PCB through the conductive pattern structure 1220a.

According to various embodiments, the conductive structure layer 1220 may be connected to the isolation area of the PCB through the conductive pattern structure 1220a. In this case, the conductive structure layer 1220 may be connected to the outer housing to be operated as an antenna radiator.

Figure 13:
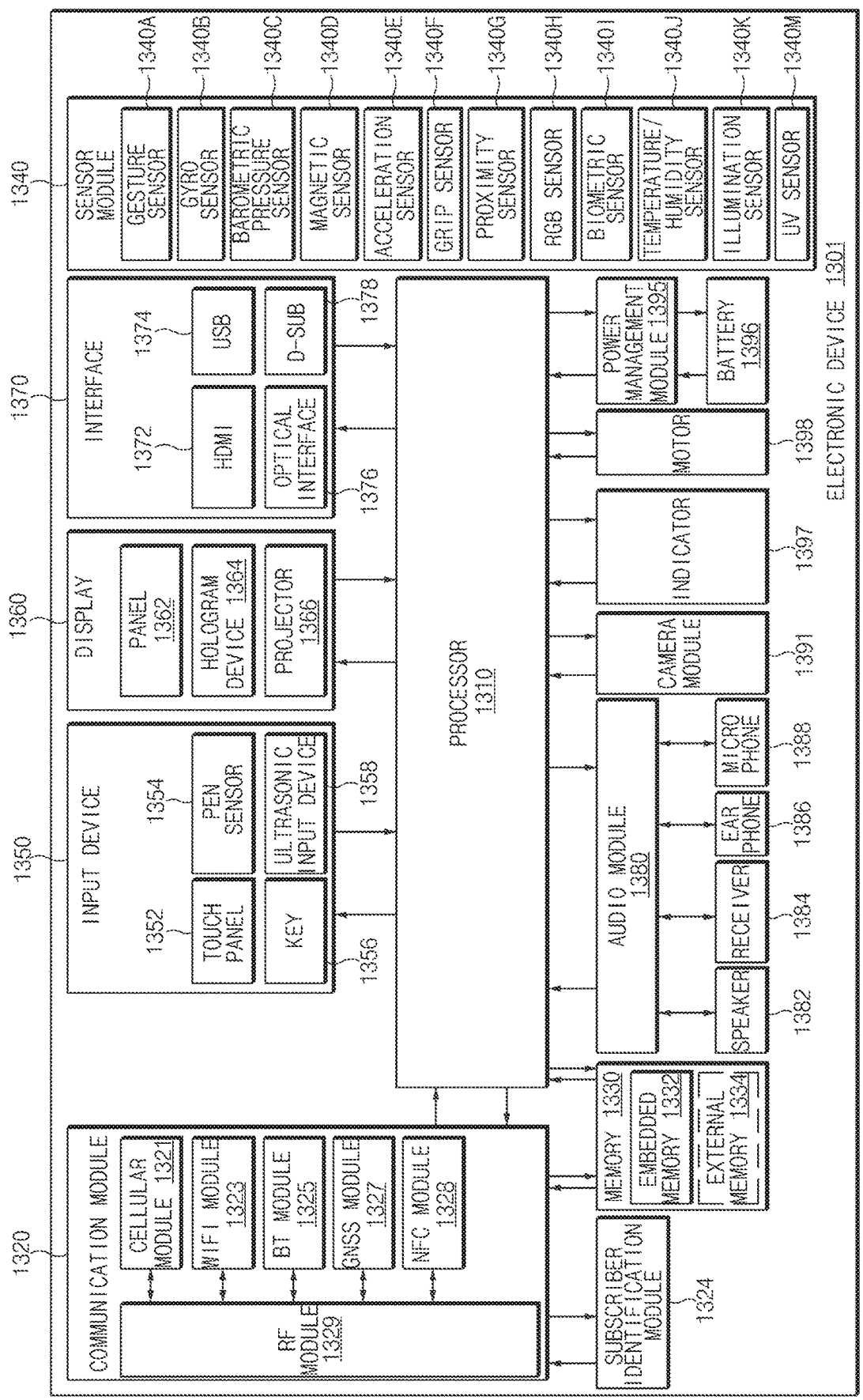
FIG. 13 is a block diagram of an electronic device according to an embodiment of the present disclosure.

FIG. 13 is a block diagram of an electronic device according to an embodiment of the present disclosure.

Referring to FIG. 13, an electronic device 1301 may include, for example, all or a part of the electronic device 101 illustrated in FIG. 1. The electronic device 1301 may include one or more processors (e.g., an AP) 1310, a communication module 1320, a subscriber identification module 1324, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may drive an OS or an application to control a plurality of hardware or software elements connected to the processor 1310 and may process and compute a variety of data. The processor 1310 may be implemented with a system on chip (SoC), for example. According to an embodiment, the processor 1310 may further include a graphic processing unit (GPU) and/or an image signal processor (ISP). The processor 1310 may include at least a part (e.g., a cellular module 1321) of elements illustrated in FIG. 13. The processor 1310 may load and process an instruction or data, which is received from at least one of other elements (e.g., a nonvolatile memory) and may store a variety of data in a nonvolatile memory.

The communication module 1320 may be configured the same as or similar to the communication interface 170 of FIG. 1. The communication module 1320 may include a cellular module 1321, a Wi-Fi module 1323, a BT module 1325, a GNSS module 1327 (e.g., a GPS module, a Glonass module, a Beidou module, or a Galileo module), an NFC module 1328, and a radio frequency (RF) module 1329.

The cellular module 1321 may provide voice communication, video communication, a message service, an Internet service or the like through a communication network. According to an embodiment, the cellular module 1321 may perform discrimination and authentication of the electronic device 1301 within a communication network using the subscriber identification module 1324 (e.g., a SIM card), for example. According to an embodiment, the cellular module 1321 may perform at least a portion of functions that the processor 1310 provides. According to an embodiment, the cellular module 1321 may include a CP.

Each of the Wi-Fi module 1323, the BT module 1325, the GNSS module 1327, and the NFC module 1328 may include a processor for processing data exchanged through a corresponding module, for example. According to an embodiment, at least a part (e.g., two or more elements) of the cellular module 1321, the Wi-Fi module 1323, the BT module 1325, the GNSS module 1327, or the NFC module 1328 may be included within one integrated circuit (IC) or an IC package.

The RF module 1329 may transmit and receive, for example, a communication signal (e.g., an RF signal). The RF module 1329 may include, for example, a transceiver, a power amplifier module (PAM), a frequency filter, a low noise amplifier (LNA), an antenna, or the like. According to another embodiment, at least one of the cellular module 1321, the Wi-Fi module 1323, the BT module 1325, the GNSS module 1327, or the NFC module 1328 may transmit and receive an RF signal through a separate RF module.

The subscriber identification module 1324 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1330 (e.g., the memory 130) may include an internal memory 1332 or an external memory 1334. For example, the internal memory 1332 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, or a solid state drive (SSD).

The external memory 1334 may include a flash drive, for example, compact flash (CF), secure digital (SD), micro-SD, mini-SD, extreme digital (xD), multimedia card (MMC), a memory stick, or the like. The external memory 1334 may be functionally and/or physically connected with the electronic device 1301 through various interfaces.

The sensor module 1340 may measure, for example, a physical quantity or may detect an operation state of the electronic device 1301. The sensor module 1340 may convert the measured or detected information to an electric signal. The sensor module 1340 may include at least one of a gesture sensor 1340A, a gyro sensor 1340B, a barometric pressure sensor 1340C, a magnetic sensor 1340D, an acceleration sensor 1340E, a grip sensor 1340F, a proximity sensor 1340G, a color sensor 1340H (e.g., red, green, blue (RGB) sensor), a biometric sensor 1340I, a temperature/humidity sensor 1340J, an illuminance sensor 1340K, or an ultraviolet (UV) sensor 1340M. Even though not illustrated, additionally or alternatively, the sensor module 1340 may include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling at least one or more sensors included therein. According to an embodiment, the electronic device 1301 may further include a processor which is a part of the processor 1310 or independent of the processor 1310 and is configured to control the sensor module 1340. The processor may control the sensor module 1340 while the processor 1310 remains at a sleep state.

The input device 1350 may include, for example, a touch panel 1352, a (digital) pen sensor 1354, a key 1356, or an ultrasonic input unit 1358. The touch panel 1352 may use at least one of capacitive, resistive, IR and ultrasonic detecting methods. Also, the touch panel 1352 may further include a control circuit. The touch panel 1352 may further include a tactile layer to provide a tactile reaction to a user.

The (digital) pen sensor 1354 may be, for example, a portion of a touch panel or may include an additional sheet for recognition. The key 1356 may include, for example, a physical button, an optical key, a keypad, or the like. The ultrasonic input device 1358 may detect (or sense) an ultrasonic signal, which is generated from an input device, through a microphone (e.g., a microphone 1388) and may check data corresponding to the detected ultrasonic signal.

The display 1360 (e.g., the display 160) may include a panel 1362, a hologram device 1364, or a projector 1366. The panel 1362 may be configured the same as or similar to the display 160 of FIG. 1. The panel 1362 may be implemented to be flexible, transparent or wearable, for example. The panel 1362 and the touch panel 1352 may be integrated into a single module. The hologram device 1364 may display a stereoscopic image in a space using a light interference phenomenon. The projector 1366 may project light onto a screen so as to display an image. The screen may be arranged inside or outside the electronic device 1301. According to an embodiment, the display 1360 may further include a control circuit for controlling the panel 1362, the hologram device 1364, or the projector 1366.

The interface 1370 may include, for example, an HDMI 1372, a USB 1374, an optical interface 1376, or a D-sub-miniature (D-sub) 1378. The interface 1370 may be included, for example, in the communication interface 170 illustrated in FIG. 1. Additionally or alternatively, the interface 1370 may include, for example, a mobile high definition link (MHL) interface, an SD card/multi-media card (MMC) interface, or an infrared data association (IrDA) standard interface.

The audio module 1380 may convert a sound and an electrical signal in dual directions. At least a part of the audio module 1380 may be included, for example, in the I/O interface 150 illustrated in FIG. 1. The audio module 1380 may process, for example, sound information that is input or output through a speaker 1382, a receiver 1384, an earphone 1386, or a microphone 1388.

The camera module 1391 for shooting a still image or a video may include, for example, at least one image sensor (e.g., a front sensor or a rear sensor), a lens, an ISP, or a flash (e.g., an LED or a xenon lamp).

The power management module 1395 may manage, for example, power of the electronic device 1301. According to an embodiment, a power management integrated circuit (PMIC) a charger IC, or a battery or fuel gauge may be included in the power management module 1395. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1396 and a voltage, current or temperature thereof while the battery is charged. The battery 1396 may include, for example, a rechargeable battery or a solar battery.

The indicator 1397 may display a specific state of the electronic device 1301 or a part thereof (e.g., the processor 1310), such as a booting state, a message state, a charging state, and the like. The motor 1398 may convert an electrical signal into a mechanical vibration and may generate a vibration effect, a haptic effect, or the like. Even though not illustrated, a processing device (e.g., a GPU) for supporting a mobile television (TV) may be included in the electronic device 1301. The processing device for supporting a mobile TV may process media data according to the standards of digital multimedia broadcasting (DMB), digital video broadcasting (DVB), MediaFlo™, or the like.

Each of the above-mentioned elements may be configured with one or more components, and the names of the elements may be changed according to the type of the electronic device. The electronic device according to various embodiments may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

The term "module" used in this disclosure may represent, for example, a unit including one or more combinations of hardware, software and firmware. For example, the term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments may be, for example, implemented by instructions stored in a non-transitory computer-readable storage media in the form of a program module. The instruction, when executed by a processor (e.g., the processor 120), may cause the one or more processors to perform a function corresponding to the instruction. The non-transitory computer-readable storage media, for example, may be the memory 130.

The non-transitory computer-readable storage media according to various embodiments may store a program for executing an operation in which a communication module receives an application package from an external device and provides the application package to a normal module of a processor, an operation in which the normal module determines whether a secure application is included in at least a portion of the application package, and an operation in which the secure module of the processor installs the secure application in the secure module or in a memory associated with the secure module.

The non-transitory computer-readable storage media may include a hard disk, a floppy disk, a magnetic media (e.g., a magnetic tape), an optical media (e.g., a compact disc read only memory (CD-ROM) and a digital versatile disc (DVD)), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware devices may be configured to operate as one or more software modules to perform operations according to various embodiments, and vice versa.

According to various embodiments, an electronic device includes an outer housing that comprises a first surface that faces a first direction, a second surface that faces a second direction opposite to the first direction, and a side surface that surrounds a space between the first surface and the second surface, a display at least a portion of which is exposed through the first surface of the outer housing, a PCB that is arranged between the second surface of the outer housing and the display, a communication circuit that is arranged on or over the PCB, a ground member that is arranged at least at a portion of the PCB, a conductive structure that defines the first surface of the outer housing and/or at least a portion of the side surface and that is electrically connected to the communication circuit, a first conductive plate that is arranged between the first surface and the second surface of the outer housing and that is electrically connected to the ground member and/or the conductive structure, and a second conductive plate that is arranged between the first conductive plate and the second surface of the outer housing and that is electrically connected to the ground member and/or the conductive structure.

According to various embodiments, the electronic device further includes a support structure that is configured to support the display, wherein the first conductive plate and/or the second conductive plate defines at least a portion of the support structure.

According to various embodiments, the electronic device further includes a third conductive plate that is arranged between the first surface and the second surface of the outer housing and that is electrically connected to the ground member and/or the conductive structure.

According to various embodiments, the electronic device further includes a control circuit that is electrically connected to the communication circuit, the first conductive plate, and the second conductive plate, wherein the control circuit transmits and receives a signal of a frequency band that is higher than a frequency band corresponding to a case in which either the first conductive plate or the second conductive plate is not present, by using the communication circuit, the first conductive plate, and the second conductive plate.

According to various embodiments, the first conductive plate and/or the second conductive plate defines at least a portion of the display.

According to various embodiments, the display includes a display panel, and an FPCB that is electrically connected to the display panel, wherein at least a portion of the second conductive plate is arranged on the FPCB. The first conductive plate is arranged between the display panel and the second conductive plate.

According to various embodiments, the display includes a touch panel that is configured to receive a user input for the display panel, wherein the first conductive plate is electrically connected to the touch panel.

According to various embodiments, the first conductive plate and/or the second conductive plate may be configured to shield at least some of electromagnetic interferences (EMIs) between at least a portion of the PCB and at least a portion of the display. The first conductive plate and/or the second conductive plate is configured to disperse heat generated by at least a portion of the PCB and/or at least a portion of the display.

According to various embodiments, the PCB may comprises a conductive material that is electrically isolated from the ground member, and the first conductive plate and/or the second conductive plate is electrically connected to the conductive structure through the conductive material.

According to various embodiments, the electronic device further includes a battery, wherein the battery is arranged between the second conductive plate and the PCB.

According to various embodiments, the electronic device further includes a binding structure that is connected to at least a portion of the outer housing and that is detachably mounted on a part of a body of the user.

According to various embodiments, the display is circular when viewed form the first surface of the outer housing.

According to various embodiments, the conductive structure is an antenna radiator structure.

According to various embodiments, an electronic device may include an outer housing that comprises a first conductive structure, a display at least a portion of which is exposed through the first surface of the outer housing, and a PCB that is electrically connected to the display, wherein the first conductive structure comprises a first point that is connected to a feeder of the PCB and a second point that is connected to a ground part of the PCB, and wherein the display comprises a second conductive structure that is electrically connected to the PCB.

According to various embodiments, the second conductive plate structure includes a conductive plate, and wherein the conductive plate comprises at least one of a first conductive plate comprised in a touch panel or a second conductive plate comprises in an FPCB for driving a display panel. The second conductive plate structure is connected to a ground part of the PCB.

According to various embodiments, the second conductive plate structure is connected to an isolation area of the PCB that comprises a conductive material, and the isolation area is connected to the first conductive structure.

According to various embodiments, the first conductive plate structure defines a first capacitor between the first conductive structure and the second conductive structure, and resonance frequency changes according to a change in a capacitance of the first capacitor.

According to various embodiments, the electronic device further includes a support structure that is arranged between the display and the PCB to fix the display, wherein the support structure comprises a third conductive structure that is electrically connected to the PCB. The third conductive plate structure is connected to a ground part of the PCB. The third conductive plate structure is connected to an isolation area of the PCB that comprises a conductive material, and the isolation area is connected to the first conductive structure.

According to various embodiments, the support structure includes a conductive area that extends due to at least one of a stainless steel structure, a plating structure, a printing structure, a deposition structure, a dual injection-molding structure, and a laser direct structuring (LDS) structure, at least a portion of a side surface thereof.

According to various embodiments, the second conductive plate structure defines a second capacitor between the second conductive structure and the third conductive structure, and resonance frequency changes according to a change in a capacitance of the second capacitor.

Modules or program modules according to various embodiments may include at least one or more of the above-mentioned elements, some of the above-mentioned elements may be omitted, or other additional elements may be further included therein. Operations executed by modules, program modules, or other elements according to various embodiments may be executed by a successive method, a parallel method, a repeated method, or a heuristic method. Also, a part of operations may be executed in different sequences, omitted, or other operations may be added.

The electronic device according to various embodiments of the present disclosure can implement a multiband antenna by using a conductive structure formed on the outer part of the electronic device and a conductive structure arranged in the interior of the electronic device.

Further, in the electronic device according to various embodiments of the present disclosure, a conductive structure included in a display or a support structure can be connected to a PCB to be utilized for the purpose of tuning frequency. Through this, the present disclosure can prevent the conductive structure from acting as an electric wave interruption factor and can improve communication performance.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   an outer housing that comprises:
   a first surface facing a first direction,
   a second surface facing a second direction opposite to the first direction, and
   a side surface surrounding a space between the first surface and the second surface;
   a printed circuit board (PCB) comprising a feeder and a ground part;
   a communication circuit arranged on or over the PCB;
   a ground member arranged at a portion of the PCB;
   a conductive structure formed of at least one of the first surface of the outer housing or at least a portion of the side surface, wherein the conductive structure is electrically connected to the communication circuit;
   a display adapted to expose at least a portion of the display through the first surface of the outer housing, wherein the display comprises a first conductive plate electrically connected to at least one of the ground part of the PCB or the conductive structure; and
   a second conductive plate electrically connected to at least one of the ground part of the PCB or the conductive structure,
   wherein the conductive structure includes a first point connected to the feeder of the PCB and a second point connected to the ground part of the PCB,
   wherein the second conductive plate is arranged between the first conductive plate and the PCB, and
   wherein the conductive structure, the first conductive plate and the second conductive plate operate as a part of a multiband antenna.

2. The electronic device of claim 1, further comprising:
   a support structure configured to support the display,
   wherein the second conductive plate forms a portion of the support structure.

3. The electronic device of claim 1, further comprising:
   a third conductive plate arranged between the first surface and the second surface of the outer housing is electrically connected to at least one of the ground part of the PCB or the conductive structure.

4. The electronic device of claim 1, further comprising:
   a control circuit electrically connected to the communication circuit, the first conductive plate, and the second conductive plate,
   wherein the control circuit is configured to transmit and receive a signal of a frequency band that is higher than the frequency band corresponding to a case in which either the first conductive plate or the second conductive plate is not present, by using the communication circuit, the first conductive plate, and the second conductive plate.

5. The electronic device of claim 1,
   wherein the display comprises:
   a display panel; and
   a flexible printed circuit board (FPCB) electrically connected to the display panel, and
   wherein at least a portion of the second conductive plate is arranged on the FPCB.

6. The electronic device of claim 5, wherein the first conductive plate is arranged between the display panel and the second conductive plate.

7. The electronic device of claim 1,
   wherein the display comprises:
   a display panel; and
   a touch panel configured to receive a user input for the display panel, and
   wherein the first conductive plate is electrically connected to the touch panel.

8. The electronic device of claim 1, wherein at least one of the first conductive plate or the second conductive plate is configured to shield at least some of electromagnetic interferences (EMIs) between at least a portion of the PCB and the portion of the display.

9. The electronic device of claim 1, wherein at least one of the first conductive plate or the second conductive plate is configured to disperse heat generated by at least one of at least a portion of the PCB or the at least the portion of the display.

10. The electronic device of claim 1,
wherein the PCB comprises a conductive material electrically isolated from the ground member, and
wherein at least one of the first conductive plate or the second conductive plate is electrically connected to the conductive structure through the conductive material.

11. The electronic device of claim 1, further comprising:
a battery,
wherein the battery is arranged between the second conductive plate and the PCB.

12. An electronic device comprising:
an outer housing having a first conductive structure;
a display adapted to expose at least a portion of the display through a first surface of the outer housing; and
a printed circuit board (PCB) electrically connected to the display, wherein the PCB comprises a feeder and a ground part,
wherein the first conductive structure comprises:
a first point connected to a feeder of the PCB, and
a second point connected to a ground part of the PCB,
wherein the display comprises a second conductive structure electrically connected to at least one of the ground part of the PCB or the first conductive structure and the PCB, and
wherein the first conductive structure and the second conductive structure operate as a part of a multiband antenna.

13. The electronic device of claim 12,
wherein the second conductive structure comprises a conductive plate, and
wherein the conductive plate comprises at least one of a first conductive plate comprised in a touch panel or a second conductive plate comprised in a flexible PCB for driving a display panel.

14. The electronic device of claim 12,
wherein the second conductive structure is connected to an isolation area of the PCB that comprises a conductive material, and
wherein the isolation area is connected to the first conductive structure.

15. The electronic device of claim 12,
wherein a first capacitor is formed between the first conductive structure and the second conductive structure, and
wherein resonance frequency is changed according to a change in a capacitance of the first capacitor.

16. The electronic device of claim 12, further comprising:
a support structure arranged between the display and the PCB to fix the display,
wherein the support structure comprises a third conductive structure electrically connected to the PCB.

17. The electronic device of claim 16,
wherein a second capacitor is formed between the second conductive structure and the third conductive structure, and
wherein resonance frequency is changed according to a change in a capacitance of the second capacitor.

18. The electronic device of claim 12, wherein the first conductive structure is formed at a periphery of a through-hole through which the display is exposed.

* * * * *